United States Patent
Carey et al.

(10) Patent No.: US 9,652,711 B2
(45) Date of Patent: May 16, 2017

(54) ANALOG SIGNAL RECONSTRUCTION AND RECOGNITION VIA SUB-THRESHOLD MODULATION

(71) Applicant: QUALCOMM Incorporated, San Diego, CA (US)

(72) Inventors: Ryan Michael Carey, San Diego, CA (US); Victor Hokkiu Chan, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 14/249,762

(22) Filed: Apr. 10, 2014

(65) Prior Publication Data

US 2015/0262054 A1    Sep. 17, 2015

Related U.S. Application Data

(60) Provisional application No. 61/952,000, filed on Mar. 12, 2014.

(51) Int. Cl.
| | |
|---|---|
| *G06F 15/18* | (2006.01) |
| *G06N 3/04* | (2006.01) |
| *G06K 9/46* | (2006.01) |
| *G06K 9/62* | (2006.01) |

(52) U.S. Cl.
CPC ........... *G06N 3/049* (2013.01); *G06K 9/4623* (2013.01); *G06K 9/627* (2013.01)

(58) Field of Classification Search
None
See application file for complete search history.

(56) References Cited

U.S. PATENT DOCUMENTS

| 5,621,858 A | 4/1997 | Stork et al. |
| 5,696,877 A | 12/1997 | Iso |
| 6,505,182 B1 | 1/2003 | Van Den Heuvel |
| 7,430,546 B1 * | 9/2008 | Suri ................. G06N 3/08 706/14 |
| 7,945,392 B2 | 5/2011 | Siekmeier et al. |

(Continued)

FOREIGN PATENT DOCUMENTS

WO    2013181637 A2    12/2013

OTHER PUBLICATIONS

Kermit et al. "Audio signal identification via pattern capture and template matching", Pattern Recognition Letters 21, 2000, pp. 269-275.*

(Continued)

*Primary Examiner* — Li-Wu Chang
(74) *Attorney, Agent, or Firm* — Patterson & Sheridan, LLP

(57) ABSTRACT

Certain aspects of the present disclosure support a method and apparatus for analog signal reconstruction and recognition via sub-threshold modulation. The analog waveform recognition in a sub-threshold region of an artificial neuron of the artificial nervous system can be performed by providing a predicted waveform in parallel to an input associated with the artificial neuron. The predicted waveform can be compared with the input and the signal can be generated based at least in part on the comparison. The signal can be a detection signal that detects matching and mismatching between the input and the predicted waveform

60 Claims, 28 Drawing Sheets

(56) References Cited

U.S. PATENT DOCUMENTS

| | | |
|---|---|---|
| 8,396,557 B2 | 3/2013 | Dilorenzo |
| 2010/0292606 A1 | 11/2010 | Prakash et al. |
| 2012/0310871 A1* | 12/2012 | Cruz-Albrecht ....... G06N 3/049 706/33 |
| 2013/0046716 A1 | 2/2013 | Chan et al. |
| 2013/0117210 A1 | 5/2013 | Hunzinger et al. |
| 2013/0117211 A1 | 5/2013 | Hunzinger et al. |
| 2013/0325767 A1 | 12/2013 | Hunzinger |

OTHER PUBLICATIONS

David et al. "Pattern Recognition Using Neural and Functional Networks", Studies in Computational Intelligence, vol. 160, Springer, 2009, Chapter 4, pp. 23.*
International Search Report and Written Opinion—PCT/US2015/017910—ISA/EPO—Nov. 13, 2015.

* cited by examiner

ANALOG SIGNAL RECONSTRUCTION AND RECOGNITION VIA SUB-THRESHOLD MODULATION

CLAIM OF PRIORITY UNDER 35 U.S.C. §119

This application claims benefit of U.S. Provisional Patent Application Ser. No. 61/952,000, filed Mar. 12, 2014 and entitled "Analog Signal Reconstruction and Recognition via Sub-threshold Modulation", incorporated by reference in its entirety.

BACKGROUND

Field

Certain aspects of the present disclosure generally relate to artificial nervous systems and, more particularly, to a method and apparatus for analog signal reconstruction and recognition via sub-threshold modulation.

Background

An artificial neural network, which may comprise an interconnected group of artificial neurons (i.e., neural processing units), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

One type of artificial neural network is the spiking neural network, which incorporates the concept of time into its operating model, as well as neuronal and synaptic state, thereby providing a rich set of behaviors from which computational function can emerge in the neural network. Spiking neural networks are based on the concept that neurons fire or "spike" at a particular time or times based on the state of the neuron, and that the time is important to neuron function. When a neuron fires, it generates a spike that travels to other neurons, which, in turn, may adjust their states based on the time this spike is received. In other words, information may be encoded in the relative or absolute timing of spikes in the neural network.

SUMMARY

Certain aspects of the present disclosure provide a method for operating an artificial nervous system. The method generally includes performing analog waveform recognition in a sub-threshold region of an artificial neuron of the artificial nervous system by providing a predicted waveform in parallel to an input associated with the artificial neuron, comparing the predicted waveform with the input, and generating a signal based at least in part on the comparison.

Certain aspects of the present disclosure provide an apparatus for operating an artificial nervous system. The apparatus generally includes a first circuit configured to perform analog waveform recognition in a sub-threshold region of an artificial neuron of the artificial nervous system by providing a predicted waveform in parallel to an input associated with the artificial neuron, a second circuit configured to compare the predicted waveform with the input, and a third circuit configured to generate a signal based at least in part on the comparison.

Certain aspects of the present disclosure provide an apparatus for operating an artificial nervous system. The apparatus generally includes means for performing analog waveform recognition in a sub-threshold region of an artificial neuron of the artificial nervous system by providing a predicted waveform in parallel to an input associated with the artificial neuron, means for comparing the predicted waveform with the input, and means for generating a signal based at least in part on the comparison.

Certain aspects of the present disclosure provide a computer program product for operating an artificial nervous system. The computer program product generally includes a non-transitory computer-readable medium (e.g., a storage device) having instructions executable to perform analog waveform recognition in a sub-threshold region of an artificial neuron of the artificial nervous system by providing a predicted waveform in parallel to an input associated with the artificial neuron, compare the predicted waveform with the input, and generate a signal based at least in part on the comparison.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
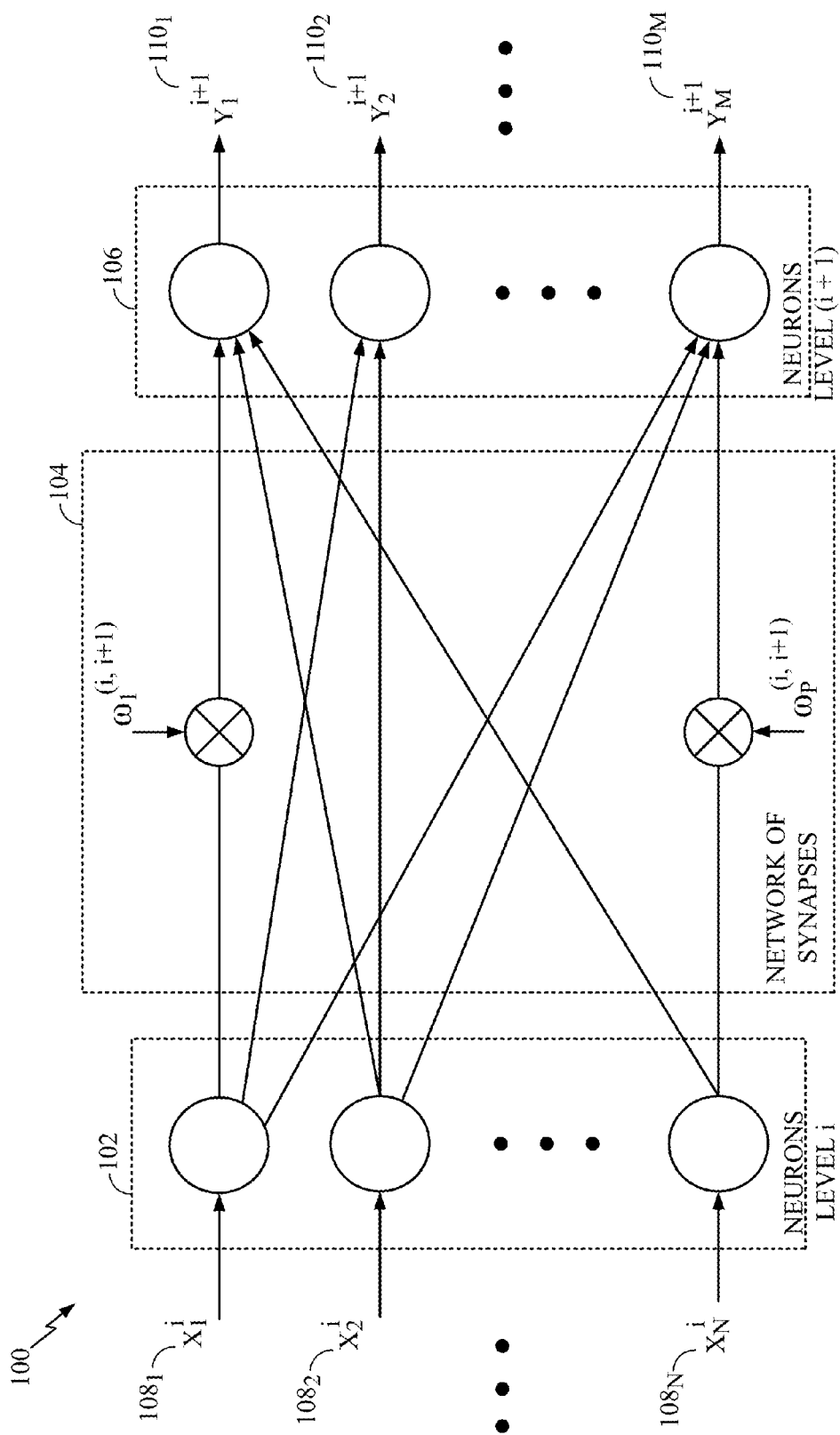
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104 (i.e., feed-forward connections). For simplicity, only two levels of neurons are illustrated in FIG. 1, although fewer or more levels of neurons may exist in a typical neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations.

In biological neurons, the output spike generated when a neuron fires is referred to as an action potential. This electrical signal is a relatively rapid, transient, all-or nothing nerve impulse, having an amplitude of roughly 100 mV and a duration of about 1 ms. In a particular aspect of a neural system having a series of connected neurons (e.g., the transfer of spikes from one level of neurons to another in FIG. 1), every action potential has basically the same amplitude and duration, and thus, the information in the signal is represented only by the frequency and number of spikes (or the time of spikes), not by the amplitude. The information carried by an action potential is determined by the spike, the neuron that spiked, and the time of the spike relative to one or more other spikes.

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals typically depolarize the membrane potential (i.e., increase the membrane potential with respect to the resting potential). If enough excitatory signals are received within a certain period to depolarize the membrane potential above a threshold, an action potential occurs in the postsynaptic neuron. In contrast, inhibitory signals generally hyperpolarize (i.e., lower) the membrane potential Inhibitory signals, if strong enough, can counteract the sum of excitatory signals and prevent the membrane potential from reaching threshold. In addition to counteracting synaptic excitation, synaptic inhibition can exert powerful control over spontaneously active neurons. A spontaneously active neuron refers to a neuron that spikes without further input, for example, due to its dynamics or feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and the like. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, wherein a particular functionality may be based on synaptic weights stored in a memory card currently attached to the neural processor.

Figure 2:
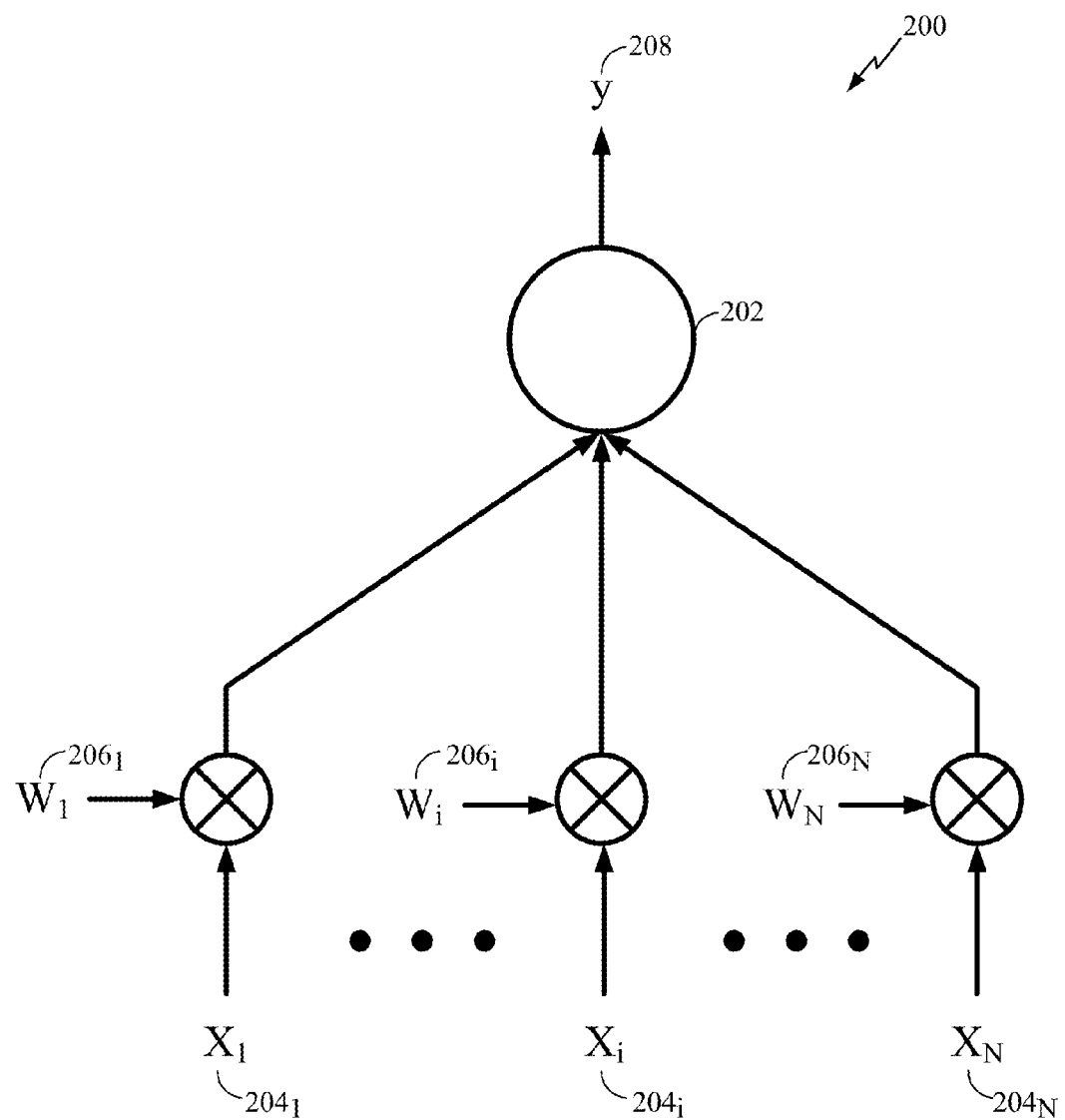
FIG. 2 illustrates an example processing unit (neuron) of a computational network (neural system or neural network), in accordance with certain aspects of the present disclosure.

FIG. 2 illustrates an example 200 of a processing unit (e.g., an artificial neuron 202) of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($x_1$-$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights 2061-206N ($w_1$-$w_N$), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron 202) may be emulated by an electrical circuit, and its input and output connections may be emulated by wires with synaptic circuits. The processing unit, its input and output connections may also be emulated by a software code. The processing unit may also be emulated by an electric circuit, whereas its input and output connections may be emulated by a software code. In an aspect, the processing unit in the computational network may comprise an analog electrical circuit. In another aspect, the processing unit may comprise a digital electrical circuit. In yet another aspect, the processing unit may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Some examples of the learning rule are the spike-timing-dependent plasticity (STDP) learning rule, the Hebb rule, the Oja rule, the Bienenstock-Copper-Munro (BCM) rule, etc. Very often, the weights may settle to one of two values (i.e., a bimodal distribution of weights). This effect can be utilized to reduce the number of bits per synaptic weight, increase the speed of reading and writing from/to a memory storing the synaptic weights, and to reduce power consumption of the synaptic memory.

Synapse Type

In hardware and software models of neural networks, processing of synapse related functions can be based on synaptic type. Synapse types may comprise non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of this is that processing can be subdivided. For example, non-plastic synapses may not require plasticity functions to be executed (or waiting for such functions to complete). Similarly, delay and weight plasticity may be subdivided into operations that may operate in together or separately, in sequence or in parallel. Different types of synapses may have different lookup tables or formulas and parameters for each of the different plasticity types that apply. Thus, the methods would access the relevant tables for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) since structural plasticity (i.e., an amount of delay change) may be a direct function of pre-post spike time difference. Alternatively, it may be set as a function of the weight change amount or based on conditions relating to bounds of the weights or weight changes. For example, a synaptic delay may change only when a weight change occurs or if weights reach zero, but not if the weights are maxed out. However, it can be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as to computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity, and homeostatic plasticity.

STDP is a learning process that adjusts the strength of synaptic connections between neurons, such as those in the brain. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. In contrast, long-term depression (LTD) may occur if an input spike tends, on average, to occur immediately after an output spike. Then, that particular input is made somewhat weaker, hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to zero or near zero.

Since a neuron generally produces an output spike when many of its inputs occur within a brief period (i.e., being sufficiently cumulative to cause the output), the subset of inputs that typically remains includes those that tended to be correlated in time. In addition, since the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by, $$\Delta w(t) = \begin{cases} a_+ e^{-t/k_+} + \mu, & t > 0 \\ a_- e^{t/k_-}, & t < 0 \end{cases} \quad (1)$$

where $k_+$ and $k_-$ are time constants for positive and negative time difference, respectively, $a_+$ and $a_-$ are corresponding scaling magnitudes, and $\mu$ is an offset that may be applied to the positive time difference and/or the negative time difference.

Figure 3:
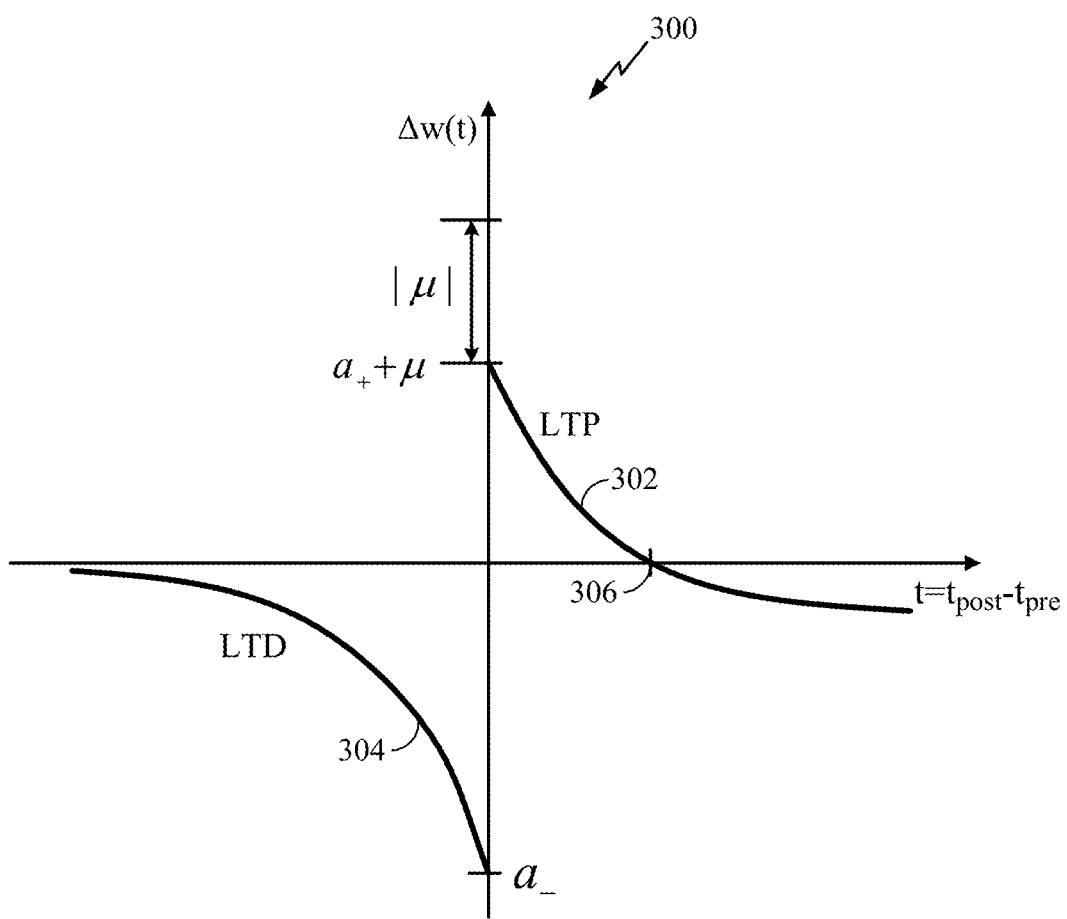
FIG. 3 illustrates an example spike-timing dependent plasticity (STDP) curve in accordance with certain aspects of the present disclosure.

FIG. 3 illustrates an example graph 300 of a synaptic weight change as a function of relative timing of pre-synaptic and post-synaptic spikes in accordance with STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset μ may be applied to the LTP (causal) portion 302 of the STDP graph. A point of cross-over 306 of the x-axis (y=0) may be configured to coincide with the maximum time lag for considering correlation for causal inputs from layer i−1 (presynaptic layer). In the case of a frame-based input (i.e., an input is in the form of a frame of a particular duration comprising spikes or pulses), the offset value μ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant of a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset μ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and have stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any) can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics, $$\frac{dv_n(t)}{dt} = \alpha v_n(t) + \beta \sum_m w_{m,n} y_m(t - \Delta t_{m,n}), \quad (2)$$

where α and β are parameters, $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e., $$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in biologically-consistent linear fashion. The time constant in the supra-threshold regime, positive by convention, reflects anti-leaky channel dynamics generally driving a cell to spike while incurring latency in spike-generation.

Figure 4:
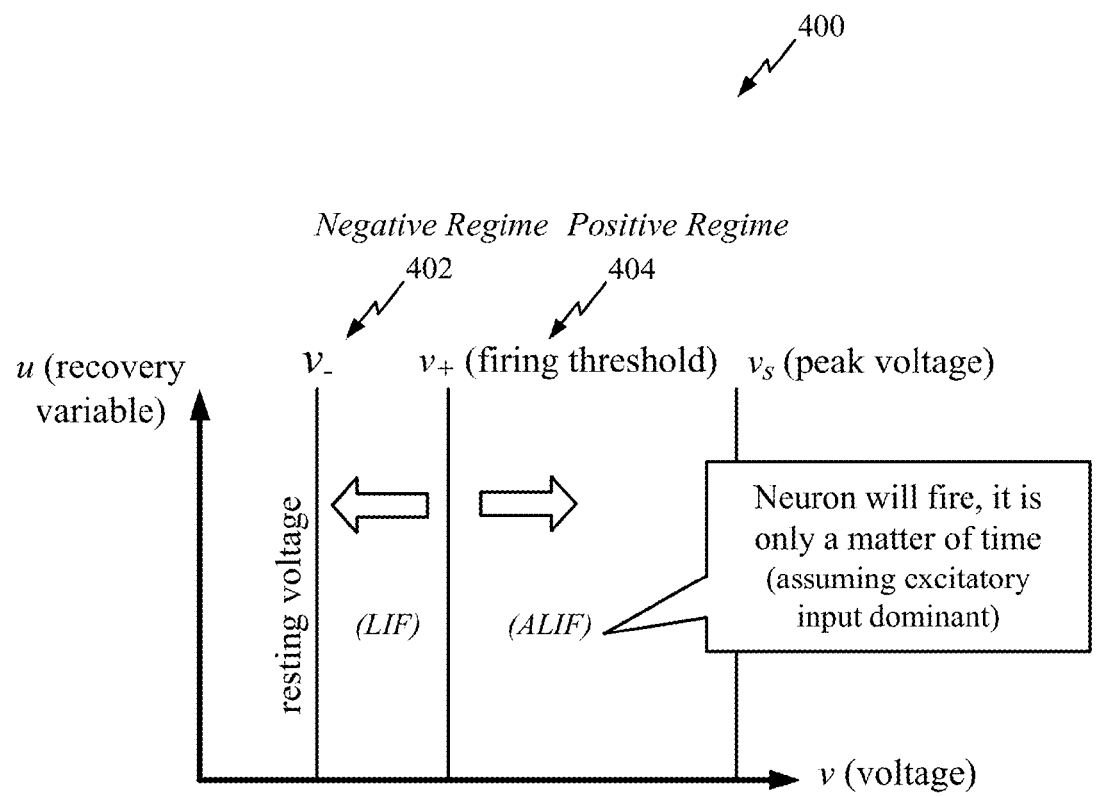
FIG. 4 is an example graph of state for an artificial neuron, illustrating a positive regime and a negative regime for defining behavior of the neuron, in accordance with certain aspects of the present disclosure.

As illustrated in FIG. 4, the dynamics of the model may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest (v_) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as, $$\tau_\rho \frac{dv}{dt} = v + q_\rho \quad (5)$$

$$-\tau_u \frac{du}{dt} = u + r \quad (6)$$

where $q_\rho$ and $r$ are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) $v$ and recovery current $u$. In basic form, the regime is essentially determined by the model state. There are subtle, but important aspects of the precise and general definition, but for the moment, consider the model to be in the positive regime 404 if the voltage $v$ is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are $$q_\rho = -\tau_\rho \beta u - v_\rho \quad (7)$$

$$r = \delta(v+\epsilon) \quad (8)$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for $v$ and $u$ are given by the negative of the transformation variables $q_\rho$ and $r$, respectively. The parameter $\delta$ is a scale factor controlling the slope of the $u$ null-cline. The parameter $\epsilon$ is typically set equal to $-v_-$. The parameter $\beta$ is a resistance value controlling the slope of the $v$ null-clines in both regimes. The $\tau_\rho$ time-constant parameters control not only the exponential decays, but also the null-cline slopes in each regime separately.

The model is defined to spike when the voltage $v$ reaches a value $v_s$. Subsequently, the state is typically reset at a reset event (which technically may be one and the same as the spike event):

$$v = \hat{v}_- \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed-form solution is possible not only for state (and with a single exponential term), but also for the time required to reach a particular state. The closed-form state solutions are $$v(t+\Delta t) = (v(t)+q_\rho)e^{\frac{\Delta t}{\tau_\rho}} - q_\rho \quad (11)$$

$$u(t+\Delta t) = (u(t)+r)e^{-\frac{\Delta t}{\tau_u}} - r \quad (12)$$

Therefore, the model state may be updated only upon events, such as upon an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by $$\Delta t = \tau_\rho \log \frac{v_f + q_\rho}{v_0 + q_\rho} \quad (13)$$

If a spike is defined as occurring at the time the voltage state $v$ reaches $v_s$, then the closed-form solution for the amount of time, or relative delay, until a spike occurs as measured from the time that the voltage is at a given state $v$ is $$\Delta t_s = \begin{cases} \tau_+ \log \frac{v_s + q_+}{v + q_+} & \text{if } v > \hat{v}_+ \\ \infty & \text{otherwise} \end{cases} \quad (14)$$

where $\hat{v}_-$ is typically set to parameter $v_+$, although other variations may be possible.

The above definitions of the model dynamics depend on whether the model is in the positive or negative regime. As mentioned, the coupling and the regime $\rho$ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Neural Coding

A useful neural network model, such as one composed of the artificial neurons 102, 106 of FIG. 1, may encode information via any of various suitable neural coding schemes, such as coincidence coding, temporal coding or rate coding. In coincidence coding, information is encoded in the coincidence (or temporal proximity) of action potentials (spiking activity) of a neuron population. In temporal coding, a neuron encodes information through the precise timing of action potentials (i.e., spikes) whether in absolute time or relative time. Information may thus be encoded in the relative timing of spikes among a population of neurons. In contrast, rate coding involves coding the neural information in the firing rate or population firing rate.

If a neuron model can perform temporal coding, then it can also perform rate coding (since rate is just a function of timing or inter-spike intervals). To provide for temporal coding, a good neuron model should have two elements: (1) arrival time of inputs affects output time; and (2) coincidence detection can have a narrow time window. Connection delays provide one means to expand coincidence detection to temporal pattern decoding because by appropriately delaying elements of a temporal pattern, the elements may be brought into timing coincidence.

Arrival Time

In a good neuron model, the time of arrival of an input should have an effect on the time of output. A synaptic input—whether a Dirac delta function or a shaped post-synaptic potential (PSP), whether excitatory (EPSP) or inhibitory (IPSP)—has a time of arrival (e.g., the time of the delta function or the start or peak of a step or other input function), which may be referred to as the input time. A neuron output (i.e., a spike) has a time of occurrence (wherever it is measured, e.g., at the soma, at a point along the axon, or at an end of the axon), which may be referred to as the output time. That output time may be the time of the peak of the spike, the start of the spike, or any other time in relation to the output waveform. The overarching principle is that the output time depends on the input time.

One might at first glance think that all neuron models conform to this principle, but this is generally not true. For example, rate-based models do not have this feature. Many spiking models also do not generally conform. A leaky-integrate-and-fire (LIF) model does not fire any faster if there are extra inputs (beyond threshold). Moreover, models that might conform if modeled at very high timing resolution often will not conform when timing resolution is limited, such as to 1 ms steps.

Inputs

An input to a neuron model may include Dirac delta functions, such as inputs as currents, or conductance-based inputs. In the latter case, the contribution to a neuron state may be continuous or state-dependent.

Analog Signal Reconstruction and Recognition Via Sub-Threshold Modulation

Pattern recognition is a ubiquitous problem, both in the brain and for those seeking to emulate it using spiking neuron networks, such as the neural network 100 from FIG. 1. The Temporal Code Learning (TCL) module used in the prior art may recognize spiking patterns by using relative synaptic delays between different inputs to correlate spikes across time, and build coincidences to be detected by a spiking neuron. However, if it is desired to recognize the aggregate continuous-time signal at the soma (represented by a pattern with firing rate changing as a function of time, e.g., r(t)), then using only TCL to detect the pattern can be highly inefficient. While it may be possible to create relative spike times by decomposing a single spike pattern into multiple sub-patterns and computing relative latencies between spikes of the sub-patterns, such exercise would be cumbersome and inefficient. Certain aspects of the present disclosure support a method that uses sub-threshold modulation to recognize changes in spike rates.

Figure 5:
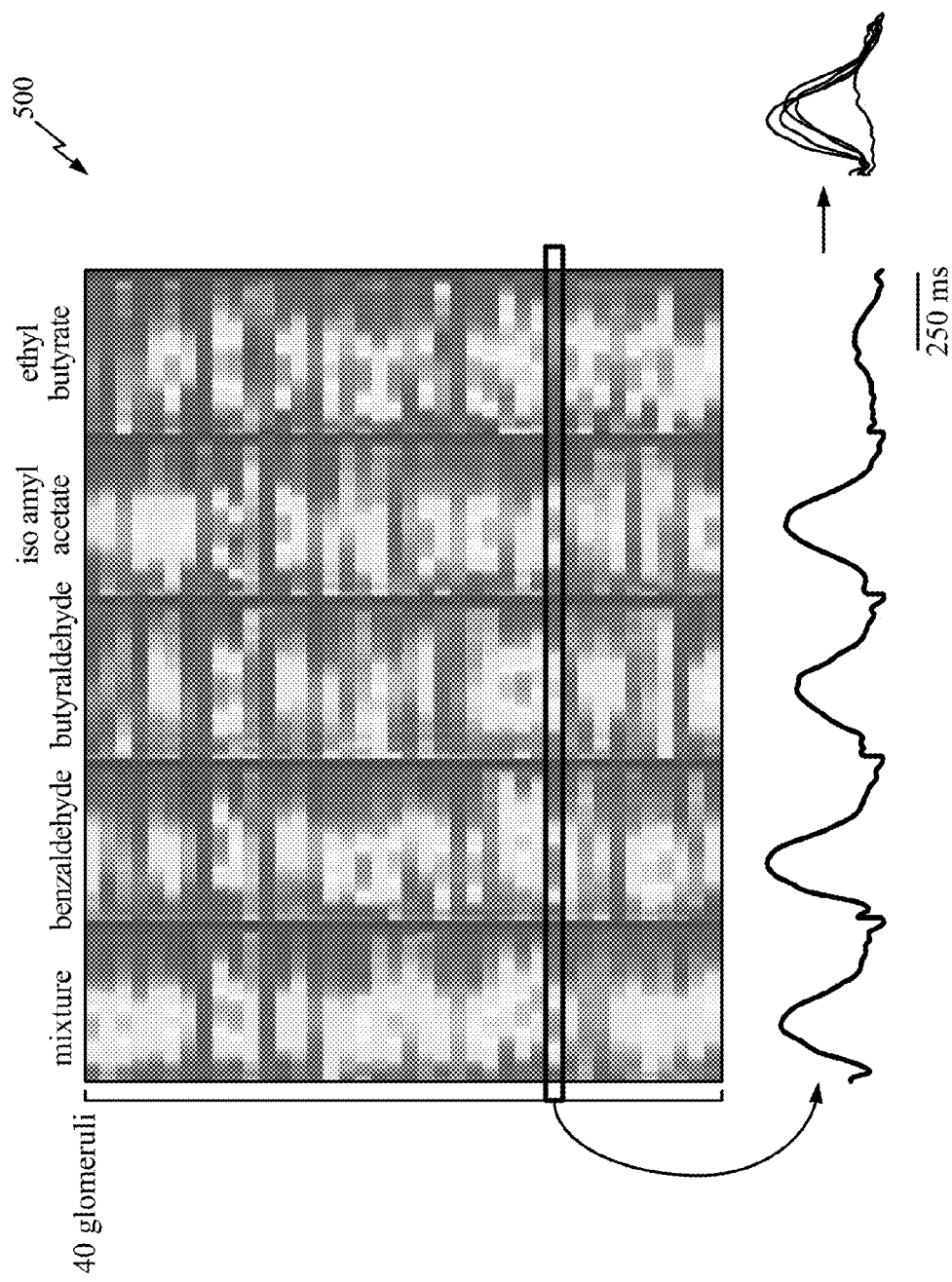
FIG. 5 illustrates an example of sensory inputs to the olfactory bulb in response to sniffing behavior that are temporally dynamic in accordance with certain aspects of the present disclosure.
Figure 6:
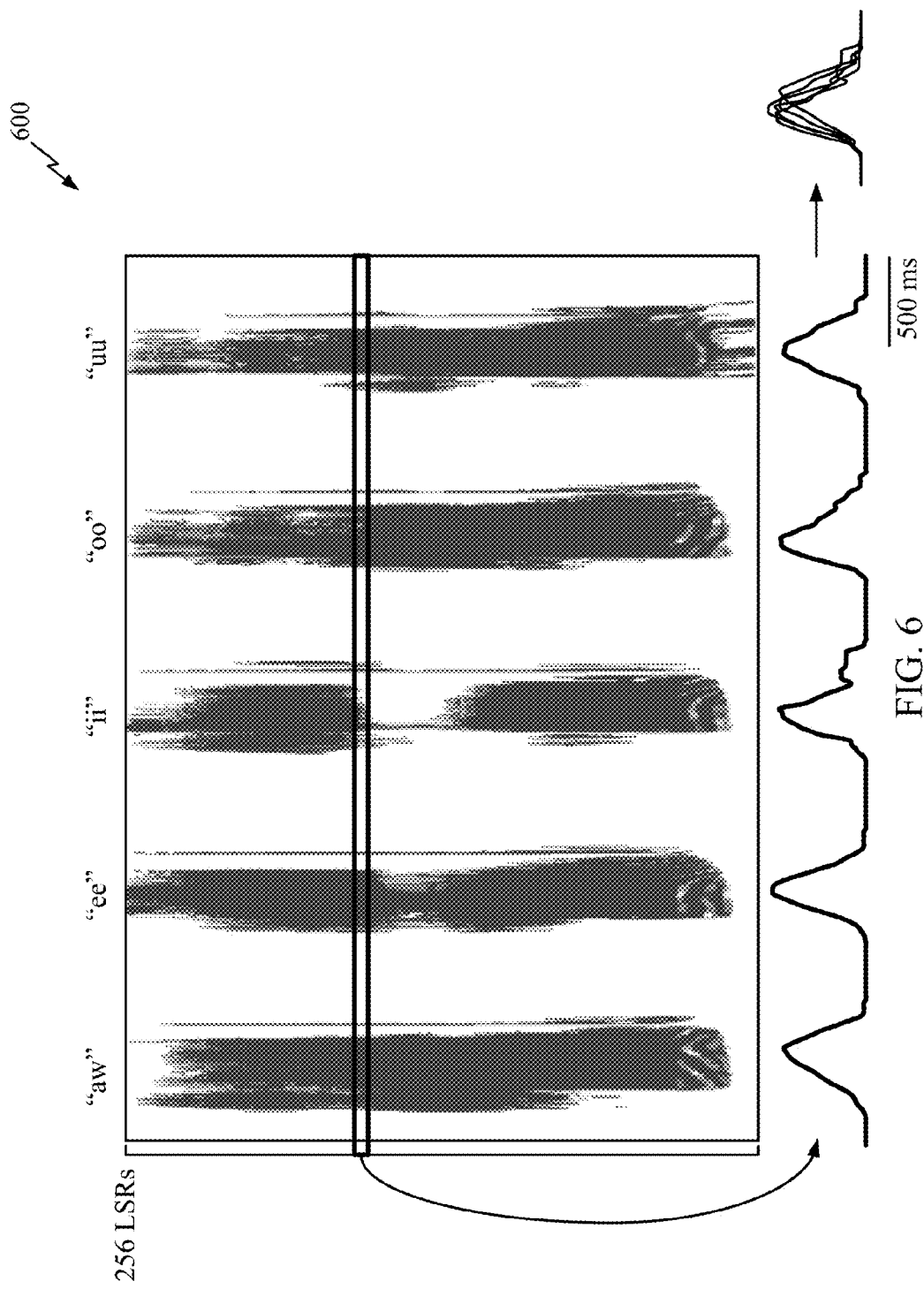
FIG. 6 illustrates an example of sensory inputs to the auditory cortex in response to voiced vowel sounds that are temporally dynamic in accordance with certain aspects of the present disclosure.

In the present disclosure, the detection of firing rate changes, r(t), may be performed in the sub-threshold analog domain of a spiking neuron. Two types of neurons can be used: an excitatory neuron to serve as the "detector" neuron, and inhibitory neurons to serve as "predictor" neurons. FIG. 5 and FIG. 6 illustrate examples 500 and 600 of sensory inputs (i.e., input signals at a soma of the detector neuron) that are temporally dynamic. The example 500 comprises a set of data on a calcium concentration level across 40 glomeruli in the rodent olfactory bulb when five different odorants are presented to an animal during dynamic sniffing behavior. The example 600 comprises sensory representations in the early auditory pathway for five different auditory inputs.

Figure 7:
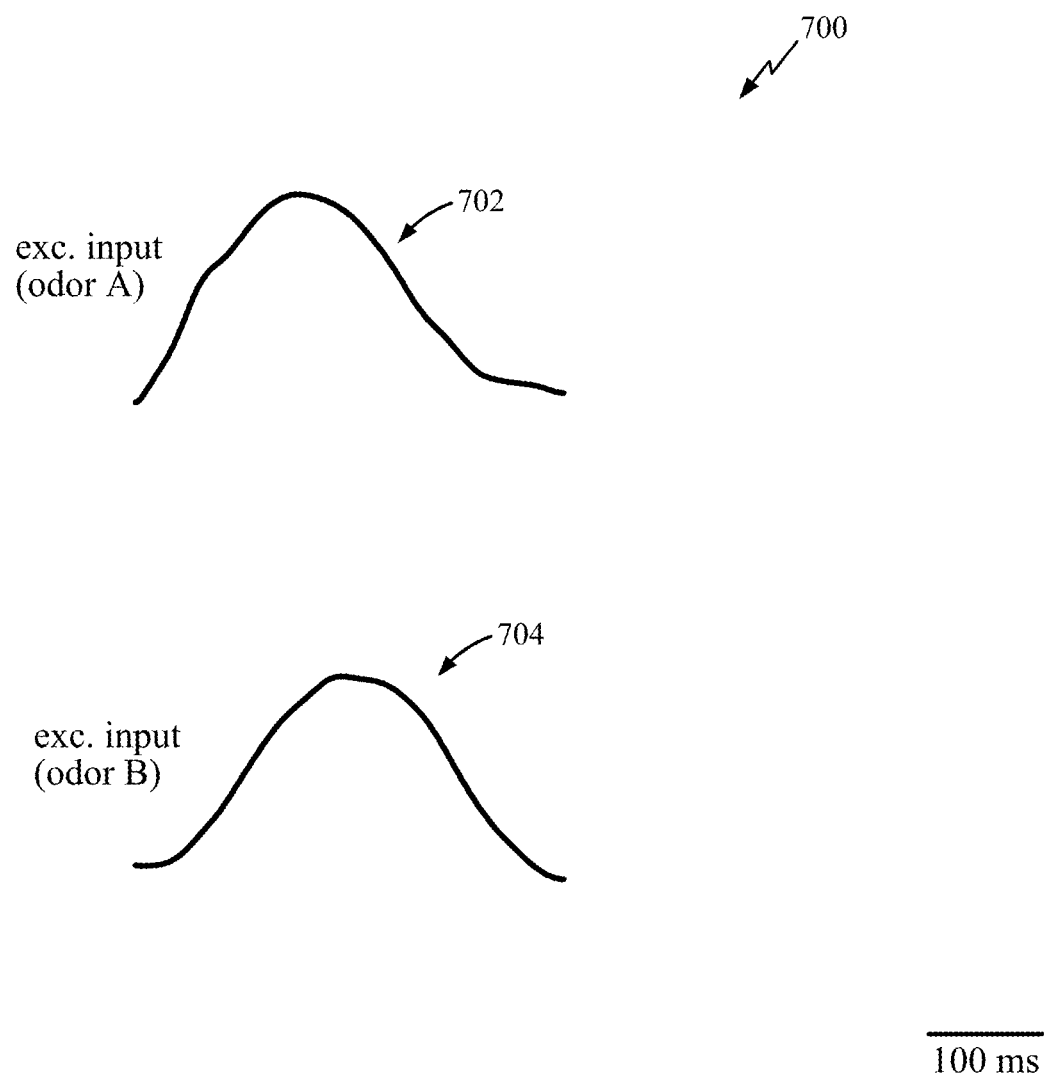
FIG. 7 illustrates an example of aggregate input currents as a function of time in accordance with certain aspects of the present disclosure.
Figure 8:
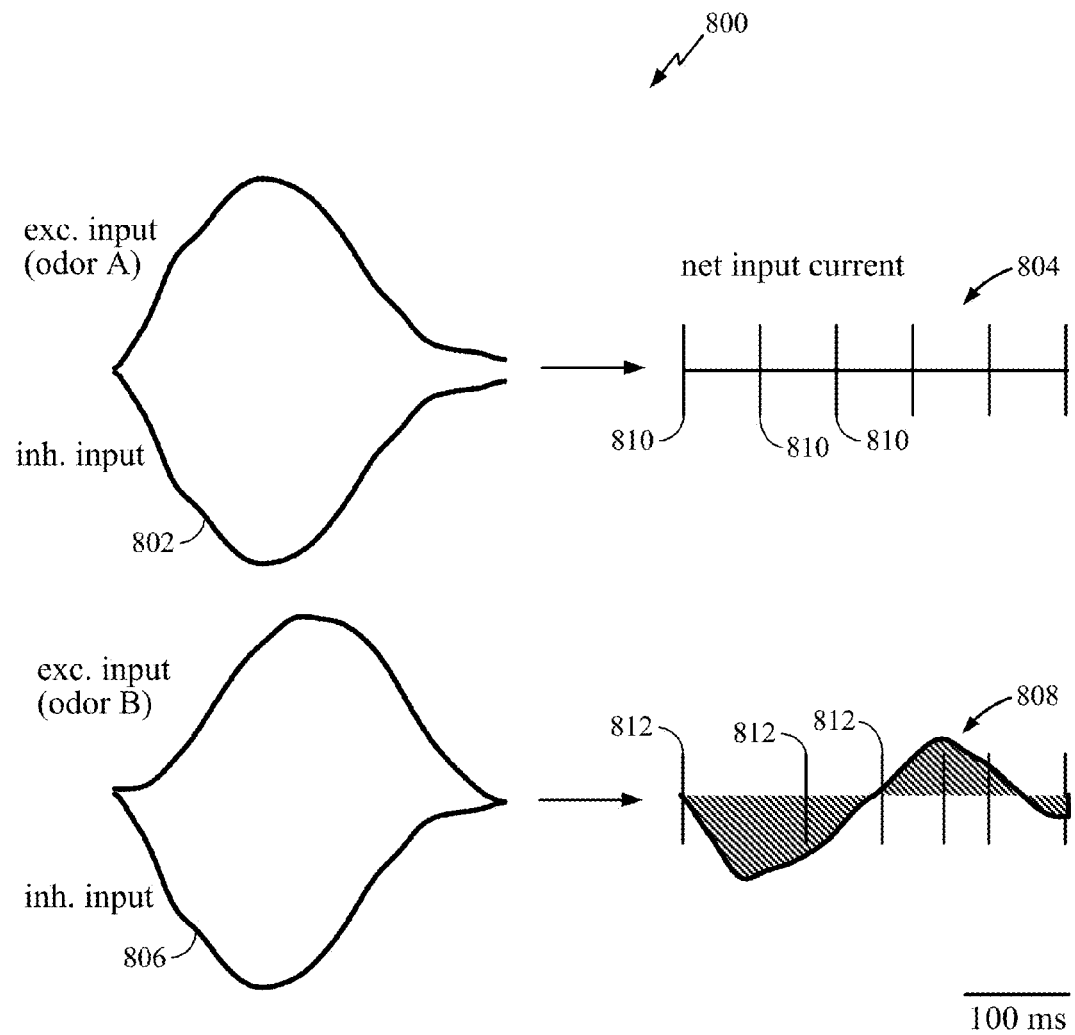
FIG. 8 illustrates an example of recognition of excitatory inputs in accordance with certain aspects of the present disclosure.

Input signals may be received by synapses and aggregated at the soma of the detector neuron to form an excitatory current waveform, which may be then compared with a "prediction" waveform generated by the set of predictor neurons. FIG. 7 illustrates an example 700 of aggregating input currents 702 and 704 that need to be recognized as a function of time in accordance with certain aspects of the present disclosure. FIG. 8 illustrates an example 800 of recognizing excitatory inputs by balancing with inhibitory predictions in accordance with certain aspects of the present disclosure. A matching predictor signal (e.g., an inhibitory input 802 in FIG. 8) may cancel out the actual input signal (within a designed temporal resolution) as illustrated by a net input current 804 in FIG. 8. On the other hand, a mismatch (e.g., an inhibitory input 806 in FIG. 8) may not cancel out the actual input signal and result in a net positive or negative input current at different points in time, as illustrated by a net input current 808 in FIG. 8.

According to certain aspects of the present disclosure, inter-spike interval (ISI) associated with spiking of a detector neuron may indicate the balance of synaptic inputs. Specifically, the net synaptic input may be coded in the ISI of tonic firing of the detector neuron, so a regular ISI duration may indicate a match between the prediction (inhibitory currents) and the actual signal (excitatory currents) within each ISI period (e.g., the regular spiking behavior illustrated by spikes 810 in FIG. 8). On the other hand, variation in the ISI duration may indicate a mismatch (e.g., the irregular spiking behavior illustrated by spikes 812 in FIG. 8).

Figure 9:
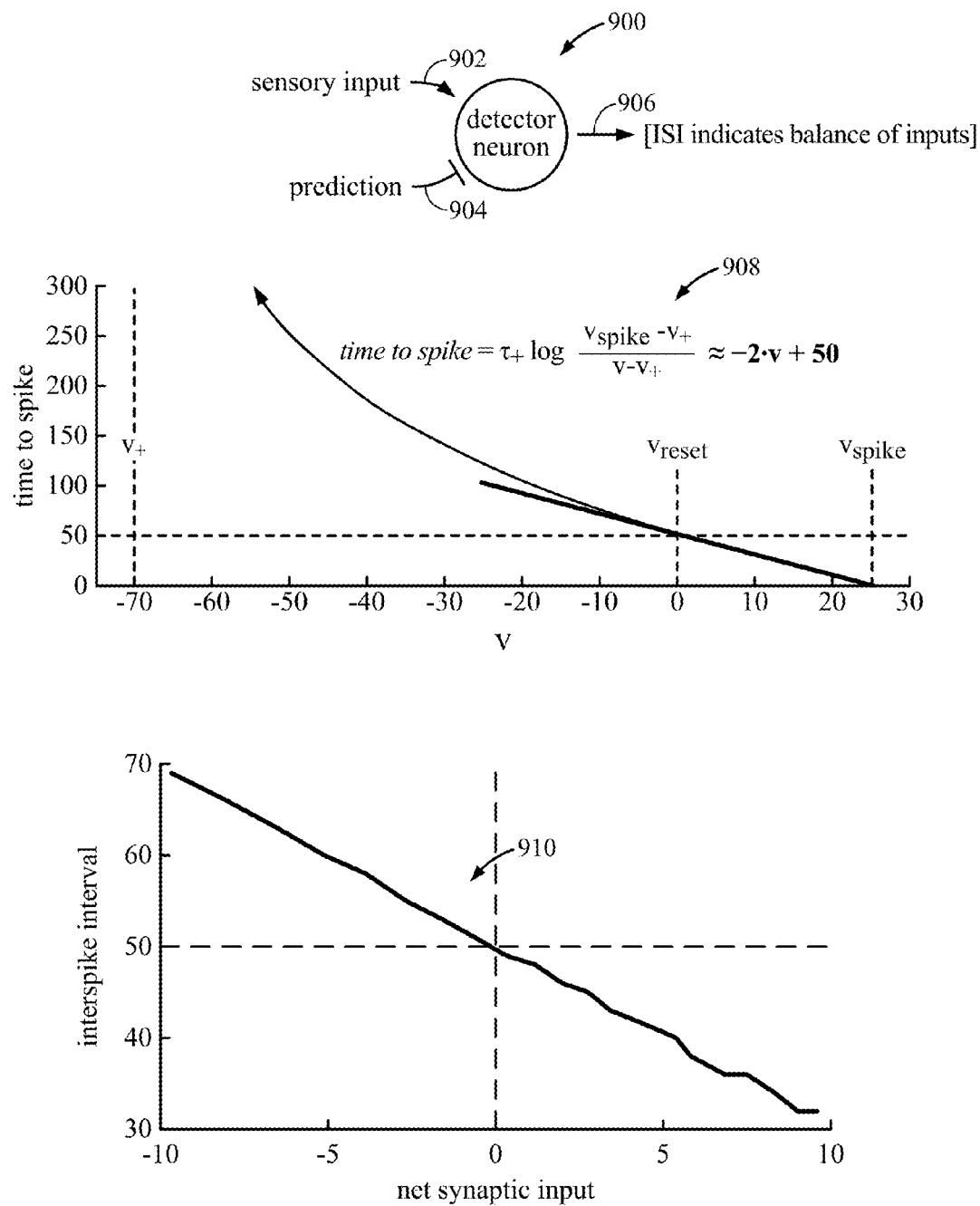
FIG. 9 illustrates an example detector neuron, a graph of a time to spike as a function of membrane voltage potential, and a graph of an inter-spike interval as a function of a net synaptic input indicating balance of synaptic inputs in accordance with certain aspects of the present disclosure.

FIG. 9 illustrates an example detector neuron 900 in accordance with certain aspects of the present disclosure, where an excitatory sensory input 902 may be recognized by an inhibitory prediction 904 based on ISI 906 of the tonic firing of the detector neuron 900. For certain configurations of the Hunzinger Cold neuron model, the time to spike defined by equation (13) can be approximately linear at high membrane potentials v. An example graph 908 in FIG. 9 illustrates a time to spike as a function of a membrane potential v in the detector neuron. In this example configuration, $v_{reset}$ is set above $v_+$ and close to $v_{spike}$, in order to ensure that the detector neuron will operate in this approximately linear regime. Graph 910 illustrates, for this example detector neuron, the ISI as a function of a net synaptic input (e.g., the excitatory sensory input 902 and the inhibitory prediction 904). For this configuration, there is an approximately linear relationship between the net synaptic input and ISI, wherein the ISI value can indicate the balance of synaptic inputs and hence the degree to which the sensory input matches the prediction.

Figure 10:
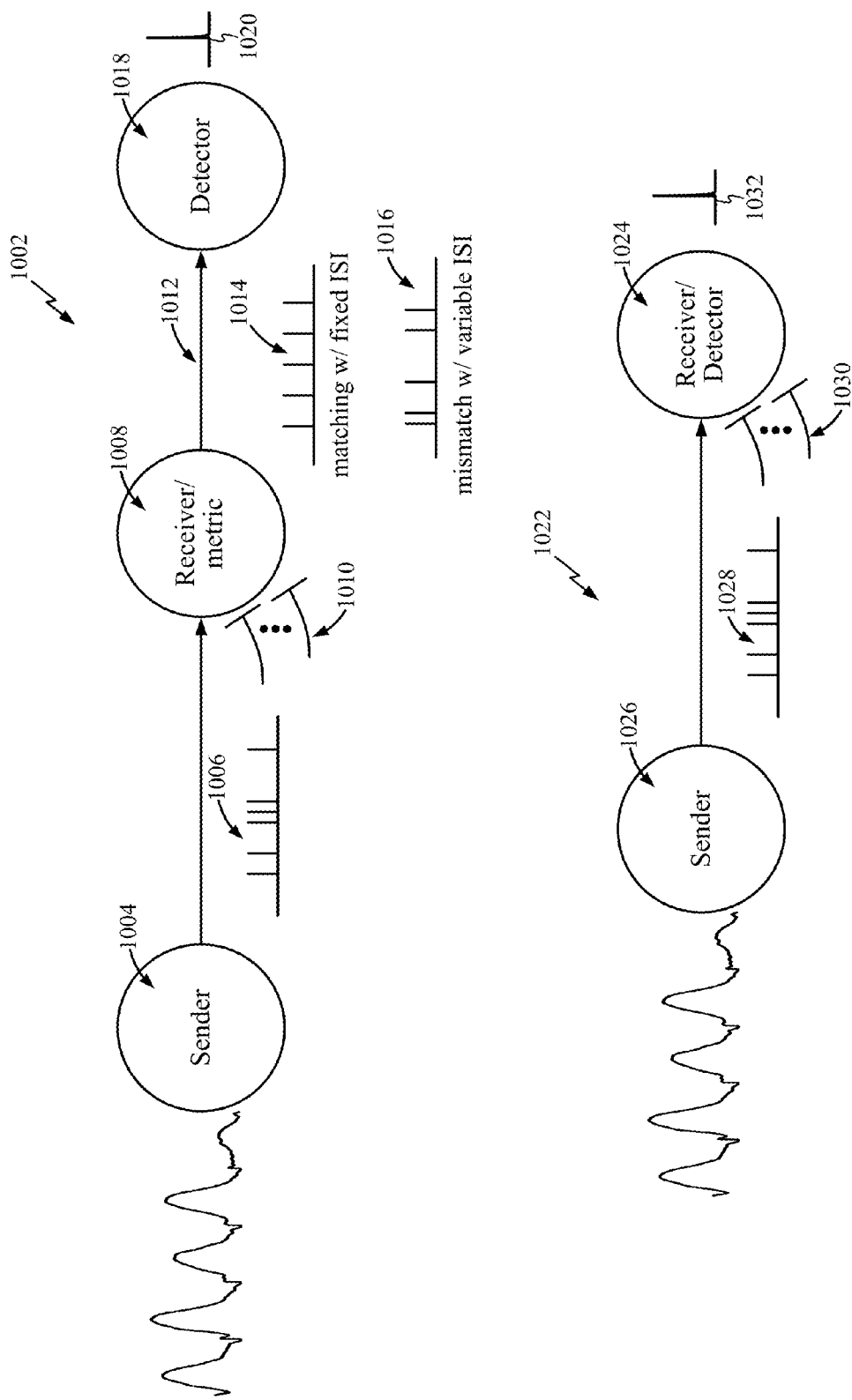
FIG. 10 illustrates examples of methods for recognizing excitatory inputs in accordance with certain aspects of the present disclosure.

In an aspect of the present disclosure, illustrated in an example 1002 in FIG. 10, a sender artificial neuron 1004 may provide an excitatory input 1006 to a receiver/metric artificial neuron 1008. The excitatory input 1006 may be an analog waveform (i.e., continuous in time) or a discrete (sampled) signal (i.e., a spike pattern). The input 1006 may comprise a plurality of input signals. The receiver/metric artificial neuron 1008 may also receive inhibitory predicted waveform(s) 1010. The predicted waveform(s) 1010 may be compared with the input 1006 to generate a signal 1012 based at least in part on the comparison. It should be noted that the predicted waveform(s) 1010 may be provided in parallel with the input 1006, i.e., the input 1006 and the predicted waveform(s) 1010 may be temporally aligned.

In the example 1002, the signal 1012 may be a matching signal 1014 or a mismatching signal 1016. The matching signal 1014 may indicate matching between the input and the predicted waveform, in this example by maintaining a continuous series of spikes with a "fixed" (uniform) ISI. In an aspect of the present disclosure, the "fixed" ISI can be defined as an ISI where variations of ISIs between any two consecutive spikes are bounded by a tolerance ±ϵ. The mismatching signal 1016 may indicate a difference between the input and the predicted waveform. In this example, the mismatching signal is indicated by variability (non-uniformity) in the ISI. In an aspect, learning (updating) of the predicted waveform may be performed based at least in part on the mismatching signal 1016. Hence, the signal 1012 generated by the receiver/metric artificial neuron 1008 is a metric signal useful for learning (updating) of predicted waveforms.

As illustrated in the example 1002 in FIG. 10, the signal 1012 may be utilized to excite a detector artificial neuron 1018 that generates a detection signal 1020. For example, the detection signal 1020 may comprise a spike that signals matching between the input 1006 and the predicted waveform 1010.

Alternatively, in another aspect of the present disclosure illustrated in an example 1022 in FIG. 10, functions of the receiver/metric artificial neuron 1008 and the detector artificial neuron 1018 may be combined into a single receiver/detector artificial neuron 1024. Similarly as in the example 1002, a sender artificial neuron 1026 may provide an excitatory input 1028 to the receiver/detector artificial neuron 1024. The receiver/detector artificial neuron 1024 may also receive inhibitory predicted waveform(s) 1030. The predicted waveform(s) 1030 may be compared with the input 1028 to generate a signal 1032 based at least in part on the comparison, wherein the signal 1032 represents a detection signal that detects matching and mismatching between the input and the predicted waveform. It should be noted that the signal 1032 is not a metric signal and cannot be utilized for learning of predicted waveforms, unlike the signal 1012.

Figure 11:
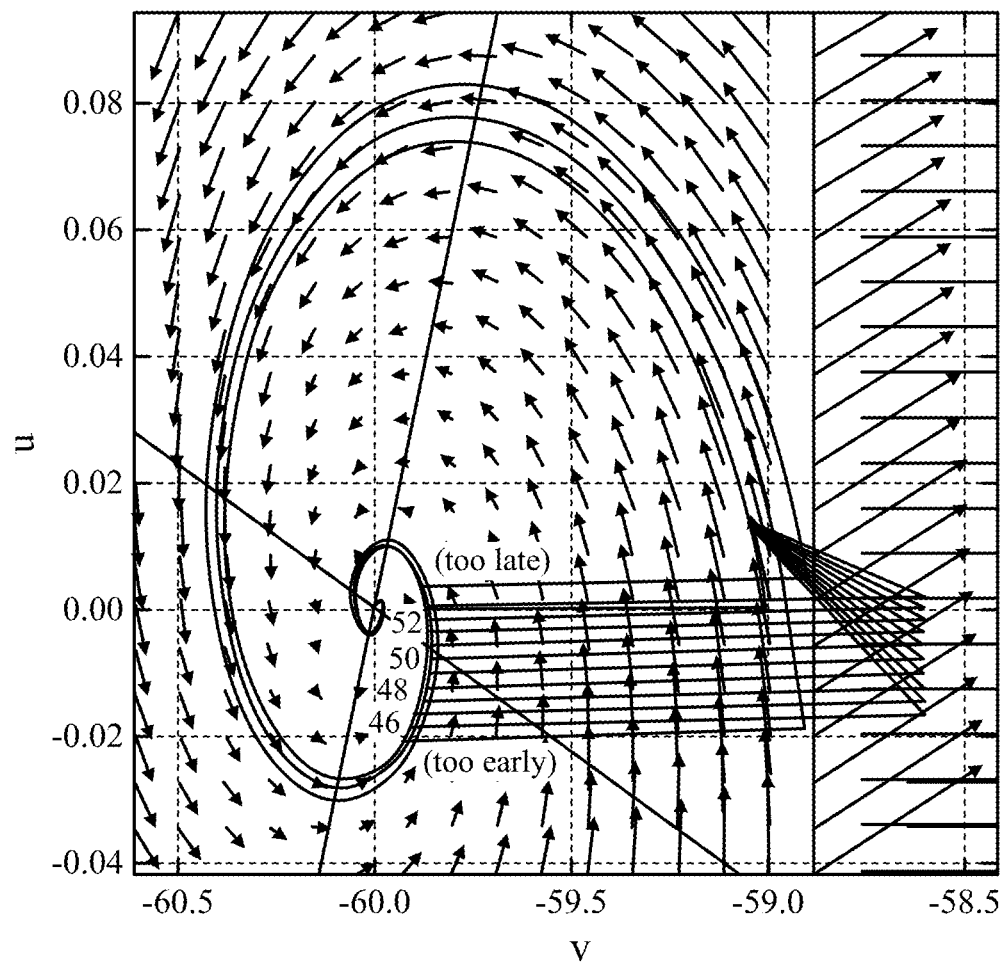
FIG. 11 illustrates an example graph of a 2D Cold neuron model that indicates changes in inter-spike interval (a "jitter detector") in accordance with certain aspects of the present disclosure.

According to certain aspects of the present disclosure, the detector neuron 900 from FIG. 9 and detector neurons 1018, 1024 from FIG. 10 may update their states in accordance with a 2D Cold neuron model, such as the Cold neuron model 1100 illustrated in FIG. 11. In an aspect, this ISI "band-pass filter" based at least in part on the Cold neuron model 1100 may set the tolerance for acceptable ISIs.

Aspects of the present disclosure support methods to learn and efficiently store waveforms as sums of inhibitory basis functions, e.g., with GABA (Gamma-Amino-Butyric Acid) like synaptic dynamics. As a result, the presented system may offer a mechanism to recognize neural patterns using potentially very few neurons and no synaptic delays.

Figure 12:
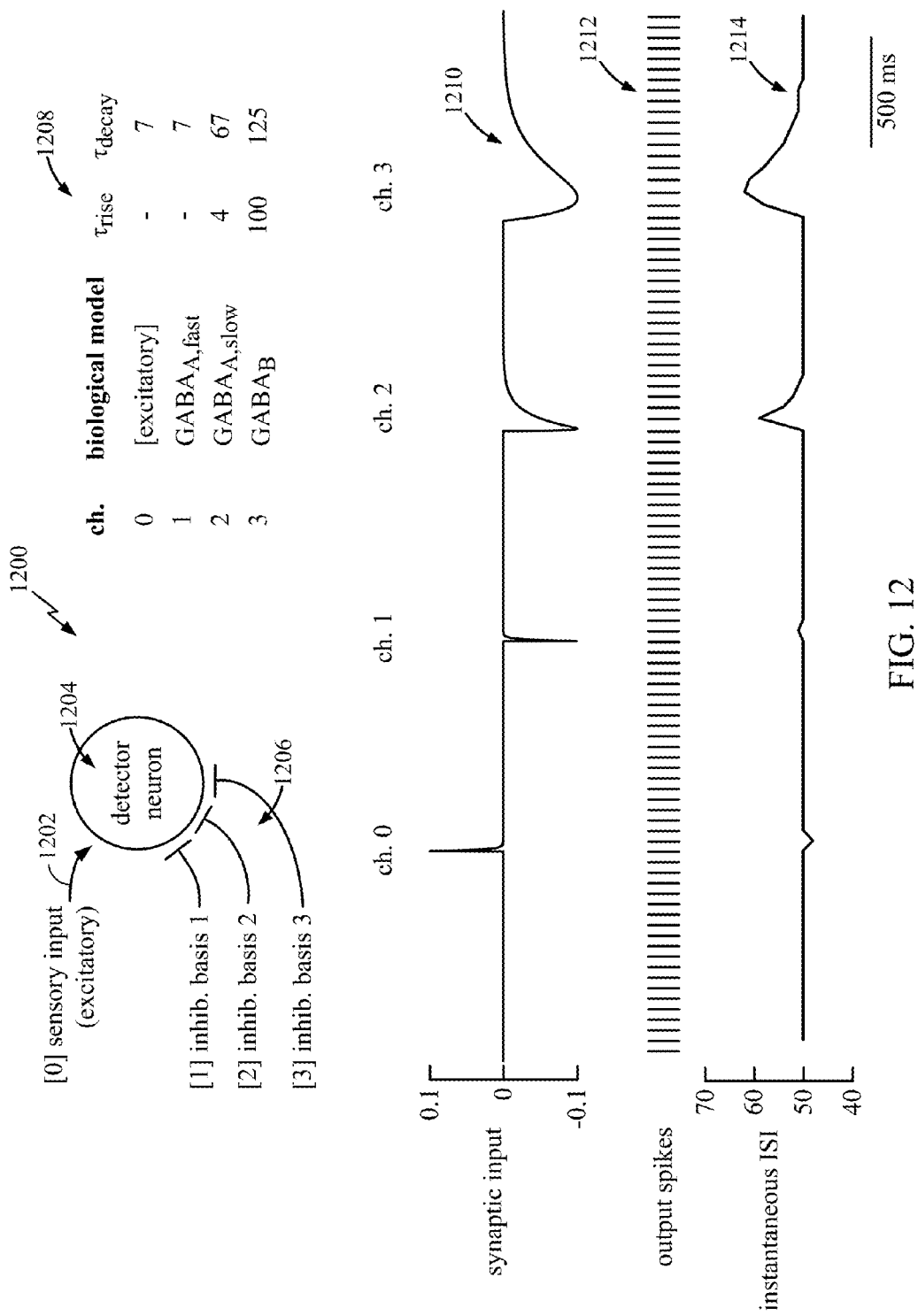
FIG. 12 illustrates an example of constructing a prediction signal in accordance with certain aspects of the present disclosure.

FIG. 12 illustrates an example 1200 of constructing a prediction signal in accordance with certain aspects of the present disclosure. As illustrated in FIG. 12, channel 0 may comprise an excitatory sensory input applied to a detector neuron 1204. Channels 1-3 comprise three inhibitory basis signals 1206 that may be biologically modeled using GABA-like basis-functions to construct a prediction signal (e.g., GABA basis functions illustrated in Table 1208 in FIG. 12). A synaptic input comprising channels 0-3 (one excitatory and three inhibitory signals) is shown in graph 1210, output spikes of the detector neuron 1204 are shown in graph 1212, and the instantaneous ISI indicating the balance of inputs is shown in graph 1214 in FIG. 12.

Figure 13:
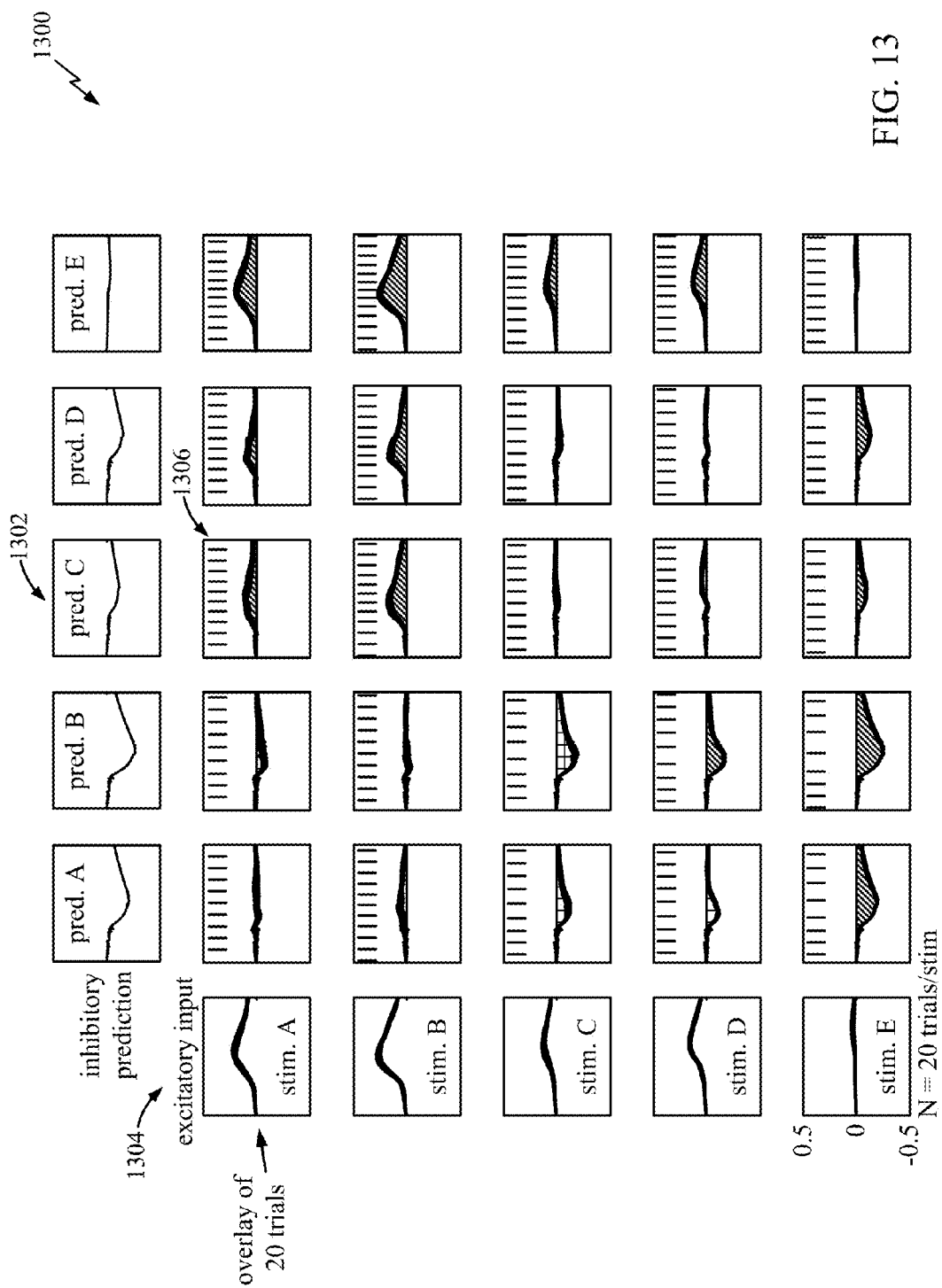
FIG. 13 illustrates examples of prediction signals used for analog waveform matching in accordance with certain aspects of the present disclosure.

FIG. 13 illustrates an example 1300 of prediction signals 1302 (i.e., signals A, B, C, D and E) for analog waveform matching in accordance with certain aspects of the present disclosure. In this example, the prediction signals 1302 A-E are generated from their respective excitatory inputs 1304 A-E using the example inhibitory basis signals illustrated in FIG. 12. Prediction signals 1302 are then utilized for analog waveform recognition of 20 trials (overlaid) of each excitatory input 1304. Other graphs 1306 illustrated in FIG. 13 show the net synaptic input to a detector neuron for each stimulus-prediction pair of signals (20 overlaid trials; net excitation proportional to an area above the zero level, net inhibition proportional to an area below the zero level) applied to the detector neuron, as well as detector neuron output spikes from an example trial for each pair. A balanced synaptic input indicates matching between a prediction signal and an excitatory input.

Figure 14:
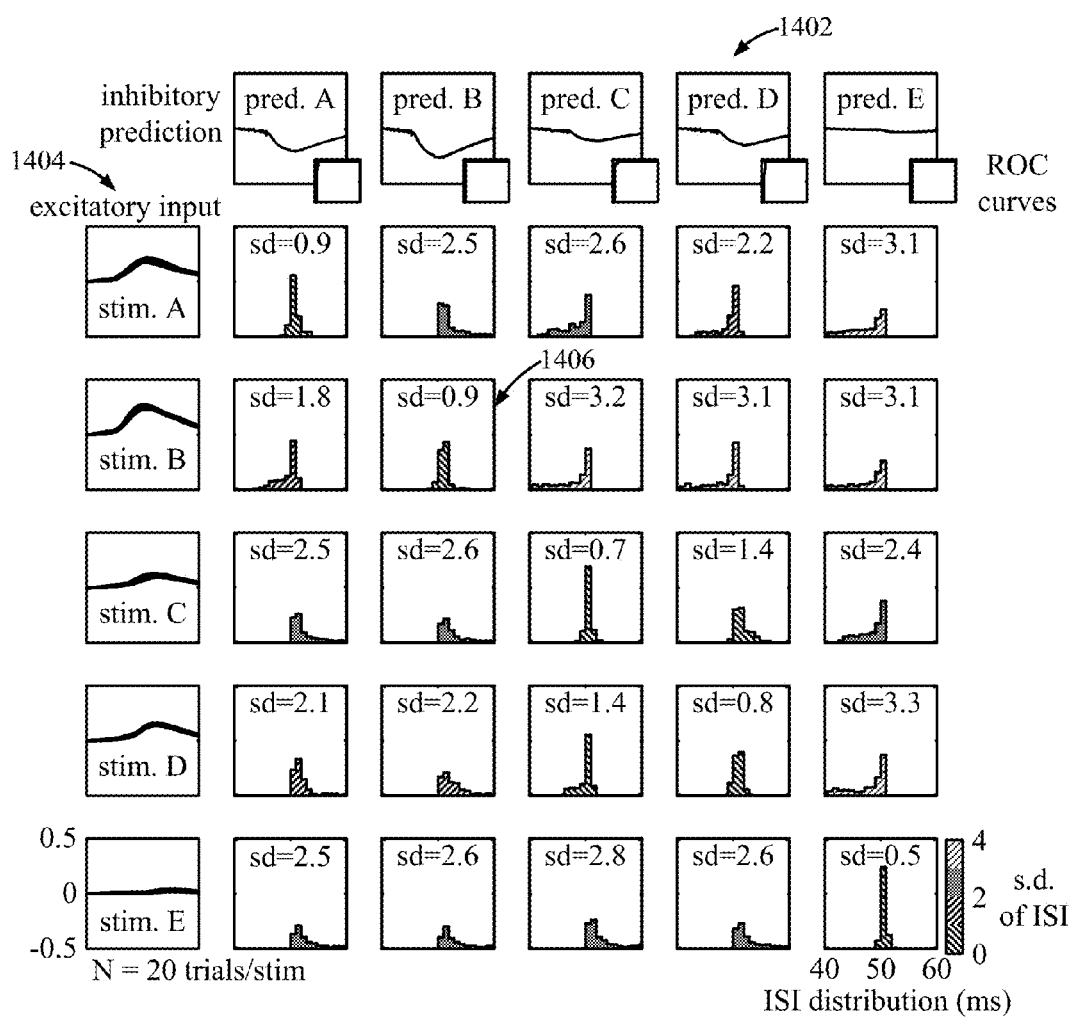
FIG. 14 illustrates examples of inter-spike intervals (ISIs) that indicate when prediction is matched by input waveform in accordance with certain aspects of the present disclosure.

FIG. 14 illustrates an example 1400 showing the distribution of ISIs for the example detector neuron for each pair of prediction signals 1402 and excitatory input signals 1404 from FIG. 14 in accordance with certain aspects of the present disclosure. Graphs 1406 show distribution of instantaneous ISI for 20 trials of each stimulus-prediction pair of signals applied to a detector neuron. In this example, when net synaptic inputs are balanced (i.e., prediction and stimulus are matched), detector neuron ISI is 50 ms. Imbalances in synaptic input (i.e., mismatches between prediction and stimulus) shift this ISI, and increase the variance in the ISI distribution. Thus, in this example, the smallest values of standard deviation of ISI indicate matching between prediction signals and excitatory inputs (ISI distributions along the diagonal).

Figure 15:
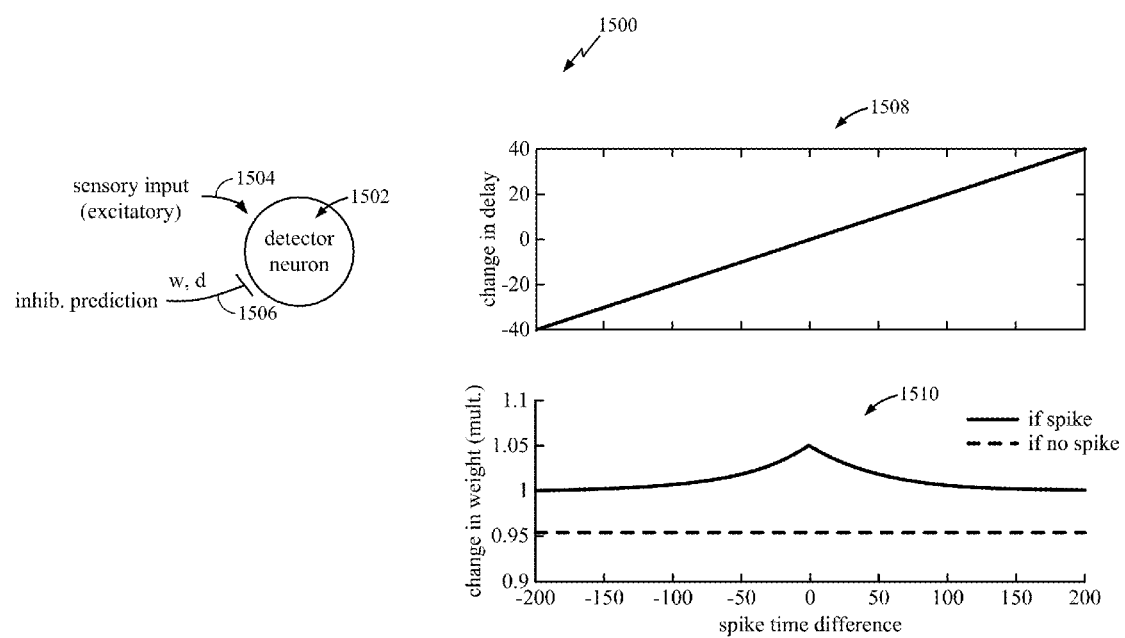
FIG. 15 illustrates an example of learning rules for learning a single inhibitory component in accordance with certain aspects of the present disclosure.

Aspects of the present disclosure support methods to learn and efficiently store waveforms as sums of inhibitory basis functions. FIG. 15 illustrates an example method 1500 of learning a single inhibitory component in accordance with certain aspects of the present disclosure. FIG. 15 illustrates an example detector neuron 1502 with an excitatory sensory input 1504 to be recognized by a single inhibitory prediction component 1506 with an associated weight w and delay d. In an aspect of the present disclosure, the single inhibitory component 1506 may be learned with delay and weight STDP rules illustrated in graphs 1508 and 1510 in FIG. 15. Delay plasticity allows the inhibitory component to temporally align with the excitatory input. Weight plasticity allows the magnitude of the inhibitory component to optimally offset the excitatory input.

Figure 16:
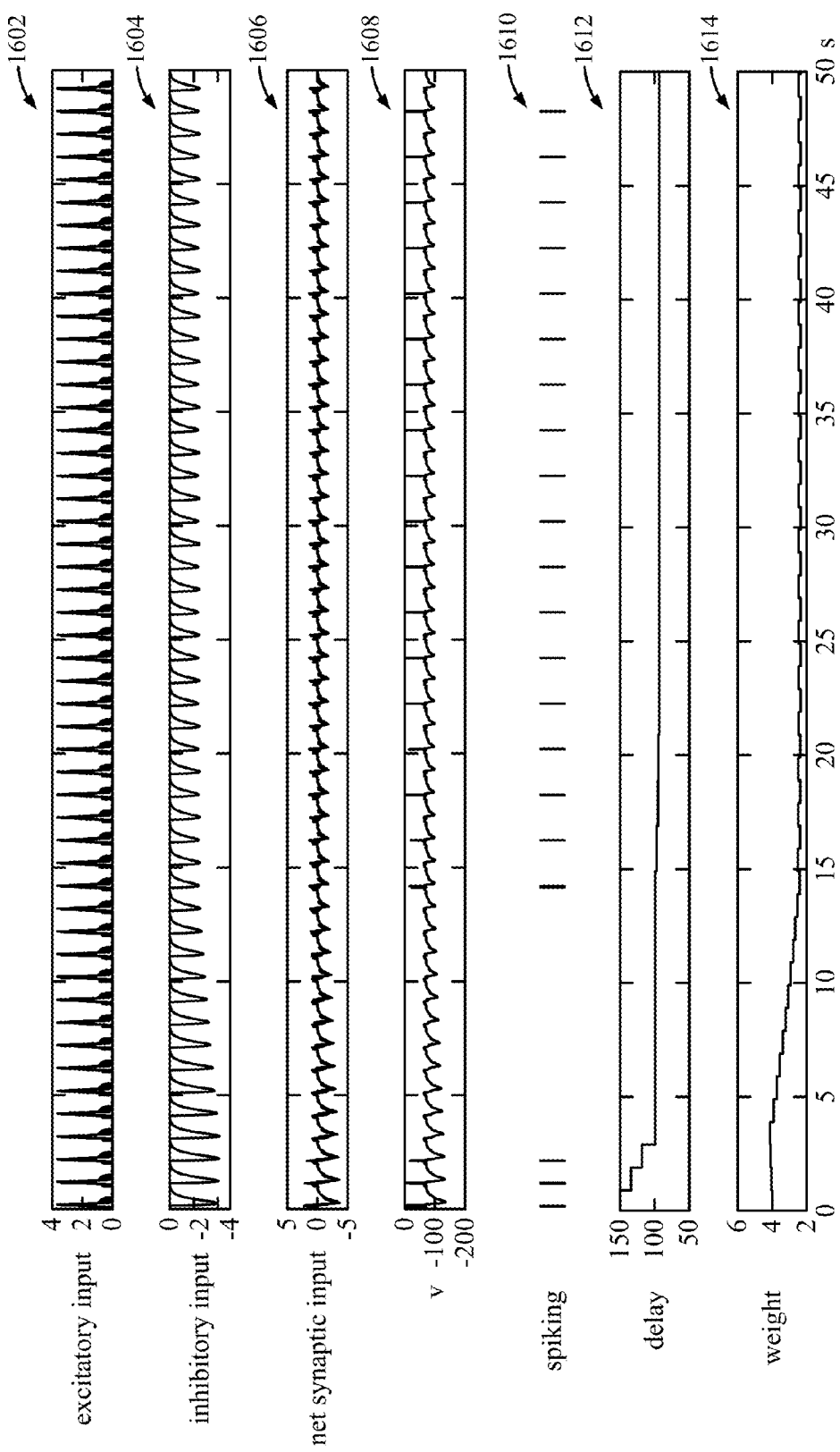
FIG. 16 illustrates an example of learning a single inhibitory component in accordance with certain aspects of the present disclosure.

FIG. 16 illustrates an example of learning a single inhibitory component with the example weight and delay STDP rules from FIG. 15 in accordance with certain aspects of the present disclosure. Graph 1602 in FIG. 16 shows an excitatory input, graph 1604 shows an inhibitory input (prediction), graph 1606 shows the resultant net synaptic input, and graph 1608 shows the membrane voltage potential of an example detector neuron (e.g., the detector neuron 1502 in FIG. 15). Graph 1610 illustrates spiking of the detector neuron, while graphs 1612 and 1614 show learned delay and weight, respectively, associated with the inhibitory input 1604. In this example, repeated presentations of the excitatory stimulus lead to learning of appropriate delay and weight values for the inhibitory component, and an inhibitory prediction that resembles the excitatory stimulus.

Figure 17:
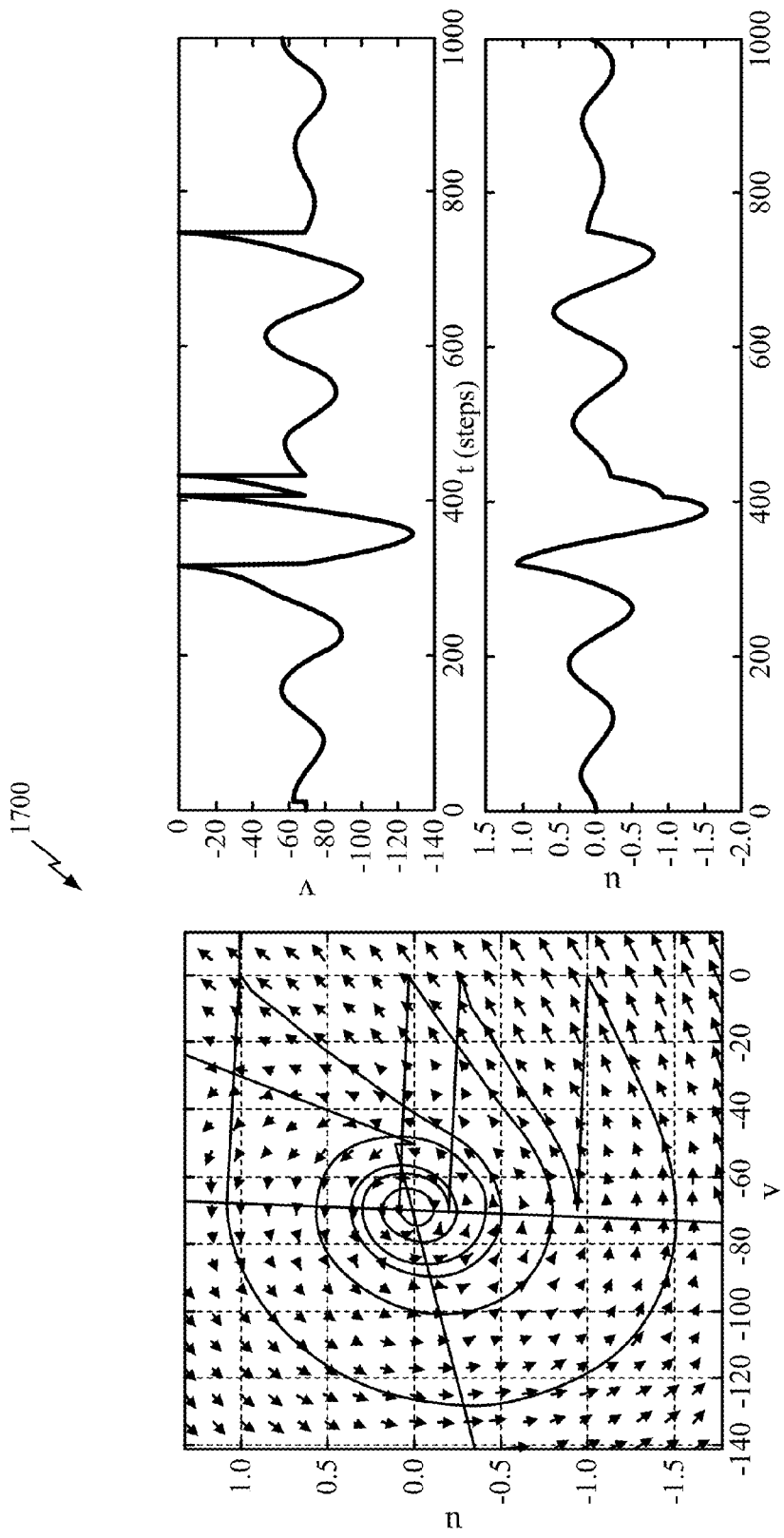
FIG. 17 illustrates an example of "chaotic" Cold neuron model in accordance with certain aspects of the present disclosure.
Figure 18:
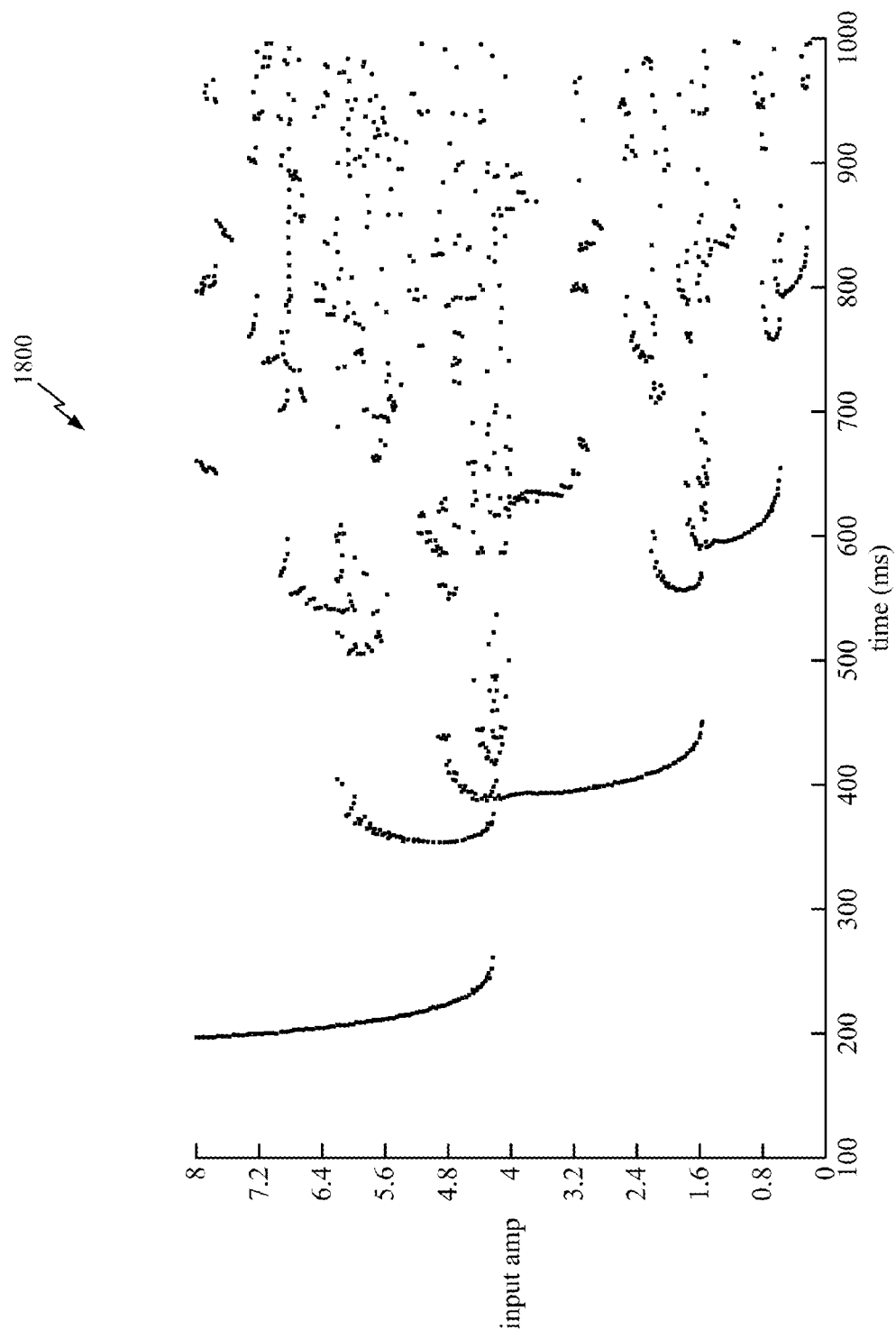
FIG. 18 illustrates an example graph of spike rasters as a function of input amplitude when utilizing the "chaotic" Cold neuron model in accordance with certain aspects of the present disclosure.

In an aspect of the present disclosure, the "chaotic" Cold neuron models may provide spike times for generating complex inhibitory patterns. FIG. 17 illustrates an example 1700 of the "chaotic" Cold neuron model with (u, v) curves in accordance with certain aspects of the present disclosure. In an aspect, the "chaotic" Cold neuron may provide a library of potential spike times. For identical Cold parameters, a range of input amplitudes may result in a diversity of spiking behavior, such as the behaviors illustrated in an example graph 1800 in FIG. 18.

Figure 19:
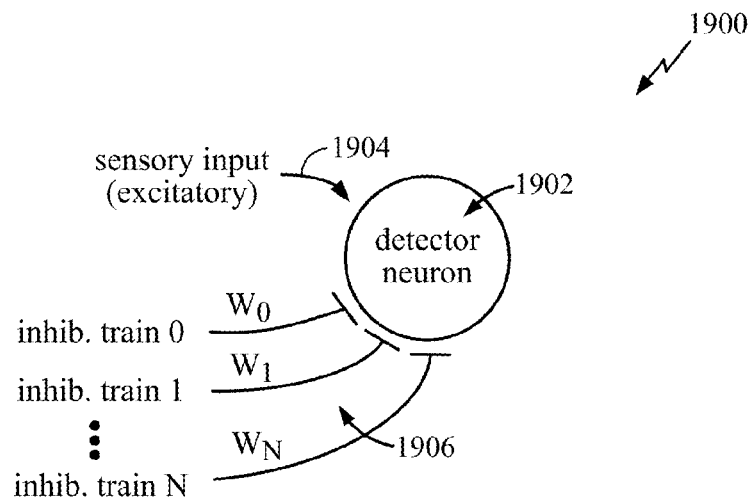
FIG. 19 illustrates an example learning rule for simultaneous learning of inhibitory components using weight STDP in accordance with certain aspects of the present disclosure.
Figure 19:
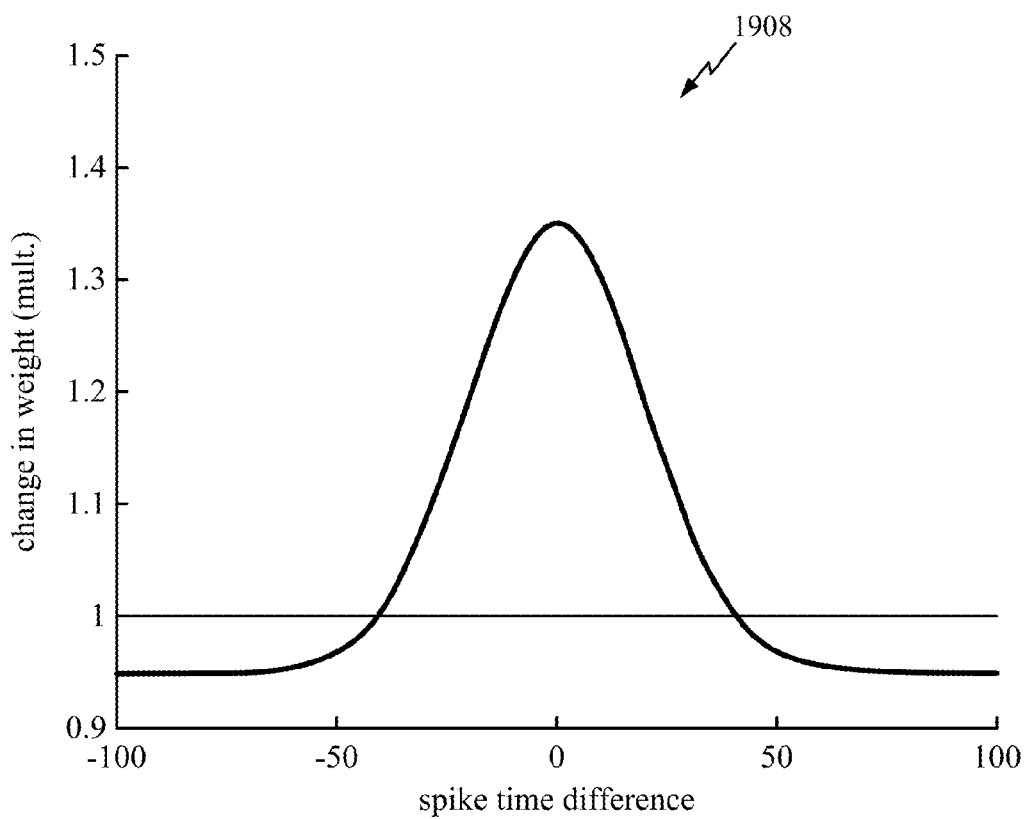

In an aspect of the present disclosure, for complex waveforms, weight plasticity may be utilized to adjust contribution of individual "basis" spike functions. FIG. 19 illustrates an example 1900 for learning of inhibitory patterns using weight STDP in accordance with certain aspects of the present disclosure. FIG. 19 illustrates an example detector neuron 1902 with an excitatory sensory input 1904 and a set of inhibitory spike trains 1906 with associated weights $w_0$, $w_1$, ... $w_N$. Inhibitory trains 1906 may be generated by "chaotic" Cold neurons such as those with spiking behaviors illustrated in FIG. 18. In an aspect of the present disclosure, the associated weights for the inhibitory trains 1906 may be learned with the weight STDP rule illustrated in graph 1908 in FIG. 19. The graph 1908 shows the multiplicative change of weight as a function of spike time difference.

Figure 20:
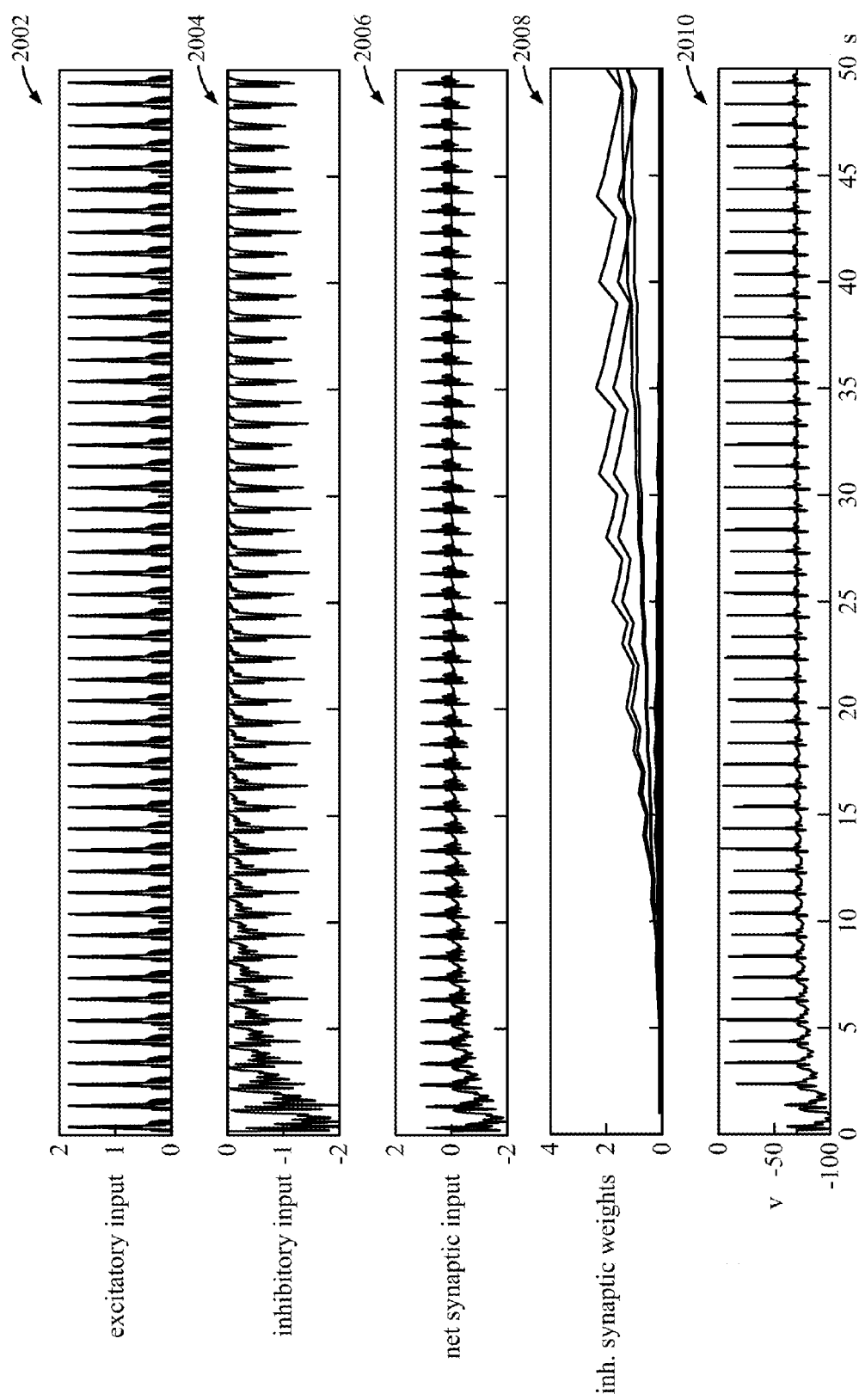
FIG. 20 illustrates an example of simultaneously learning inhibitory components using weight STDP in accordance with certain aspects of the present disclosure.

FIG. 20 illustrates an example of learning inhibitory patterns using the example weight STDP rule from FIG. 19 in accordance with certain aspects of the present disclosure. Graph 2002 shows the excitatory input (e.g., the excitatory sensory input 1904 in FIG. 19), graph 2004 shows the sum of inhibitory inputs (e.g., the sum of inhibitory spike trains 1906 in FIG. 19), graph 2006 shows the resultant net synaptic input, and graph 2010 shows a membrane voltage potential of a detector neuron (e.g., the detector neuron 1902 in FIG. 19). Learned inhibitory synaptic weights are illustrated in a graph 2008 in FIG. 20. In this example, repeated presentations of the excitatory stimulus lead to learning of appropriate weight values for the inhibitory components, and an inhibitory prediction that resembles the excitatory stimulus.

Figure 21:
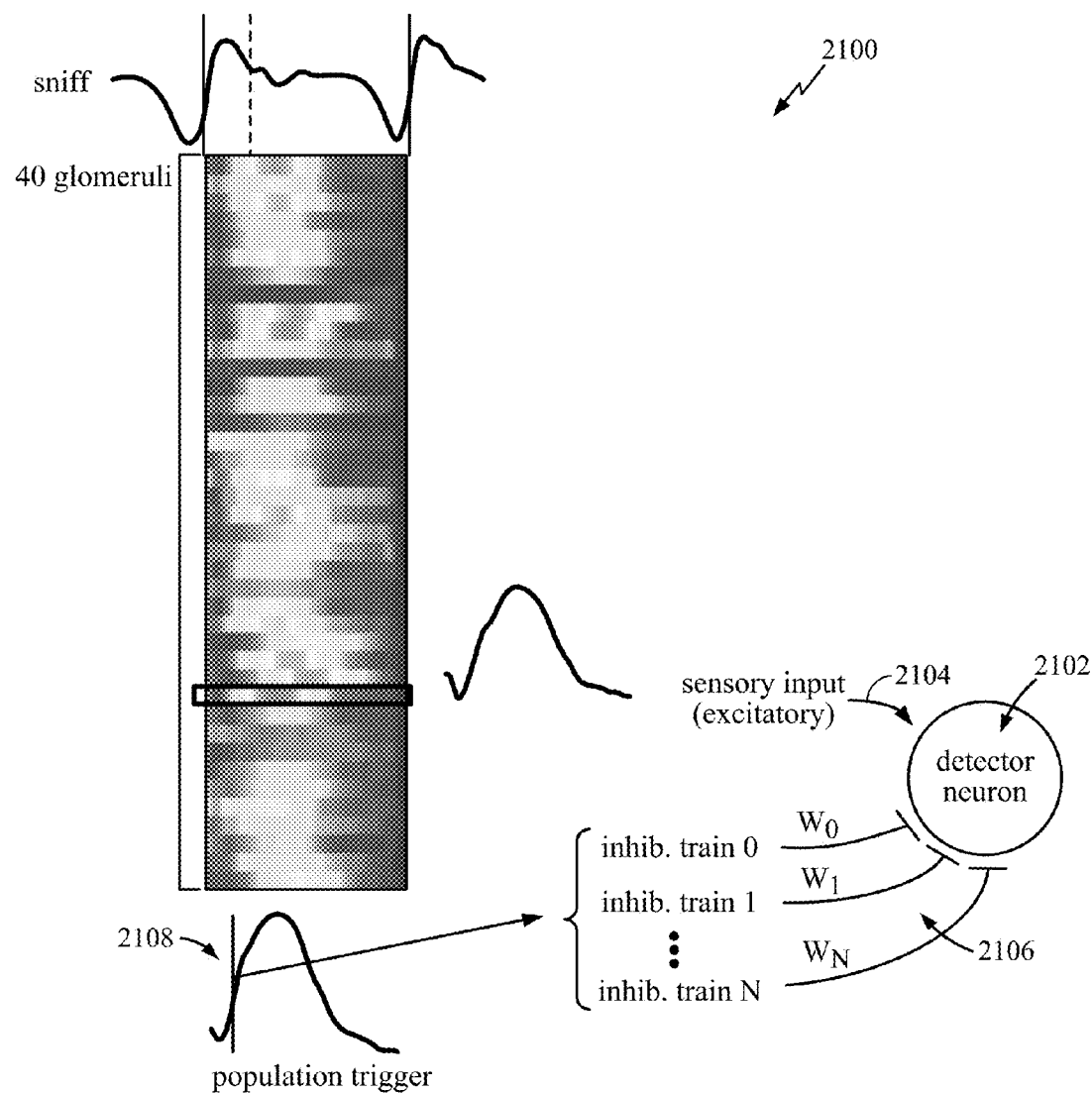
FIG. 21 illustrates an example of inhibitory prediction replay triggered by population activity in accordance with certain aspects of the present disclosure.

FIG. 21 illustrates an example 2100 of inhibitory prediction replay triggered by population activity in accordance with certain aspects of the present disclosure. FIG. 21 illustrates an example detector neuron 2102 with an excitatory sensory input 2104 to be recognized by an inhibitory training pattern 2106 with associated weights $w_0, w, ... w_N$. In an aspect, the inhibitory prediction 2106 may be triggered by population activity 2108. In another aspect, the inhibitory prediction 2106 may be triggered by efferent copy.

Figure 22:
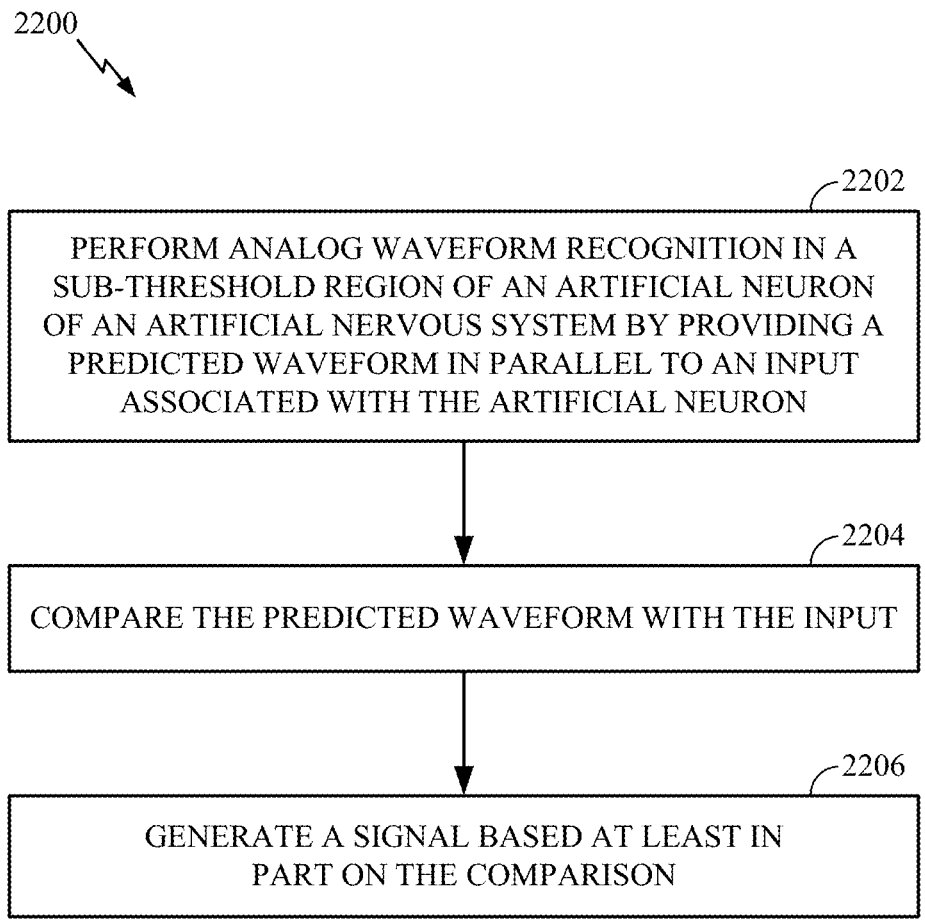
FIG. 22 illustrates a flow diagram of example operations for operating an artificial nervous system in accordance with certain aspects of the present disclosure.

FIG. 22 is a flow diagram of example operations 2200 for operating an artificial nervous system with a plurality of artificial neurons in accordance with certain aspects of the present disclosure. The operations 2200 may be performed in hardware (e.g., by one or more neural processing units, such as a neuromorphic processor), in software, or in firmware. The artificial nervous system may be modeled on any of various biological or imaginary nervous systems, such as a visual nervous system, an auditory nervous system, the hippocampus, etc.

The operations 2200 may begin, at 2202, by performing analog waveform recognition in a sub-threshold region of an artificial neuron of the artificial nervous system by providing a predicted waveform in parallel to an input associated with the artificial neuron. At 2204, the predicted waveform may be compared with the input. At 2206, a signal may be generated based at least in part on the comparison.

According to certain aspects of the present disclosure, the signal may indicate a degree to which the input and the predicted waveform match. In an aspect, updating (learning) the predicted waveform may be based at least in part on the signal. According to certain aspects, the input may comprise a plurality of input signals that may be analog (i.e., continuous-time signals) or discretized/sampled. In an aspect of the present disclosure, a detector artificial neuron of the artificial nervous system may generate, based at least in part on the signal, a detection signal that detects matching between the input and the predicted waveform.

According to certain aspects of the present disclosure, comparing the predicted waveform with the input may comprise detecting matching and mismatching between the input and the predicted waveform based at least in part on spikes of tonic firing of an integrator comprising the artificial neuron. In an aspect, inter-spike intervals (ISIs) of the spikes of the tonic firing may indicate matching between the input and the predicted waveform or a mismatch between the input and the predicted waveform. In an aspect, the ISIs indicate matching between the input and the predicted waveform if variations of the ISIs are bounded by a defined (small) value. An alert may be generated, by a jitter detector of the artificial nervous system, a delay line of the artificial nervous system, or a leaky integrate-and-fire (LIF) neural network within the artificial nervous system, when one or more of the ISIs is greater than a first threshold or smaller than a second threshold. In an aspect, a frequency of sampling of the tonic firing may be tuned to match inherent dynamics of a signal associated with the tonic firing. In an aspect, tuning the frequency of sampling of the tonic firing may be achieved by adjusting one or more parameters of the artificial neuron.

According to certain aspects of the present disclosure, the predicted waveform may be generated as a sum of inhibitory post-synaptic currents (IPSCs) generated by precisely-timed and weighted interneuron spikes of the artificial nervous system. In an aspect, a learning mechanism for generating the interneuron spikes may be performed by using weight and delay plasticity rules. In another aspect, a learning mechanism for generating the interneuron spikes may be performed spikes by using weight plasticity to adjust contributions of individual basis spike functions associated with inhibitory artificial neurons of the artificial nervous system. The chaotic Cold neuron model for the inhibitory artificial neurons may provide a library of spike times associated with the inhibitory artificial neurons, wherein the learning mechanism may be based at least in part on the library of spike times.

Figure 23:
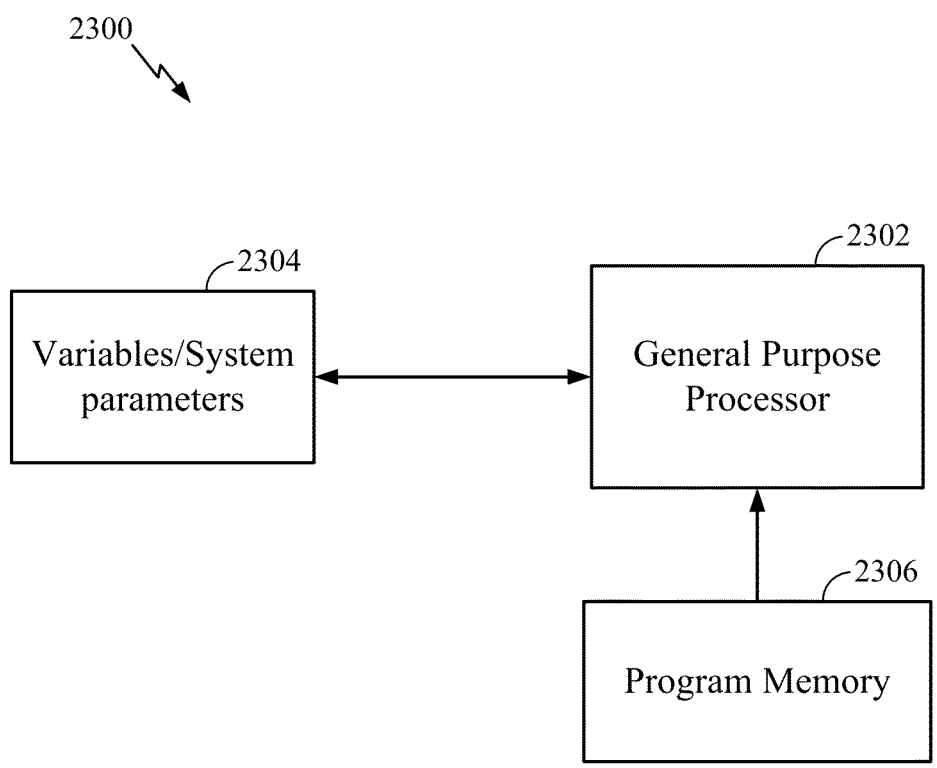
FIG. 23 illustrates an example implementation for operating an artificial nervous system using a general-purpose processor, in accordance with certain aspects of the present disclosure.

FIG. 23 illustrates an example block diagram 2300 of the aforementioned method for operating an artificial nervous system with a plurality of artificial neurons using a general-purpose processor 2302 in accordance with certain aspects of the present disclosure. Variables (neural signals), synaptic weights, and/or system parameters associated with a computational network (neural network) may be stored in a memory block 2304, while instructions related executed at the general-purpose processor 2302 may be loaded from a program memory 2306. In an aspect of the present disclosure, the instructions loaded into the general-purpose processor 2302 may comprise code for performing analog waveform recognition in a sub-threshold region of an artificial neuron of the artificial nervous system by providing a predicted waveform in parallel to an input associated with the artificial neuron, for comparing the predicted waveform with the input, and for generating a signal based at least in part on the comparison.

Figure 24:
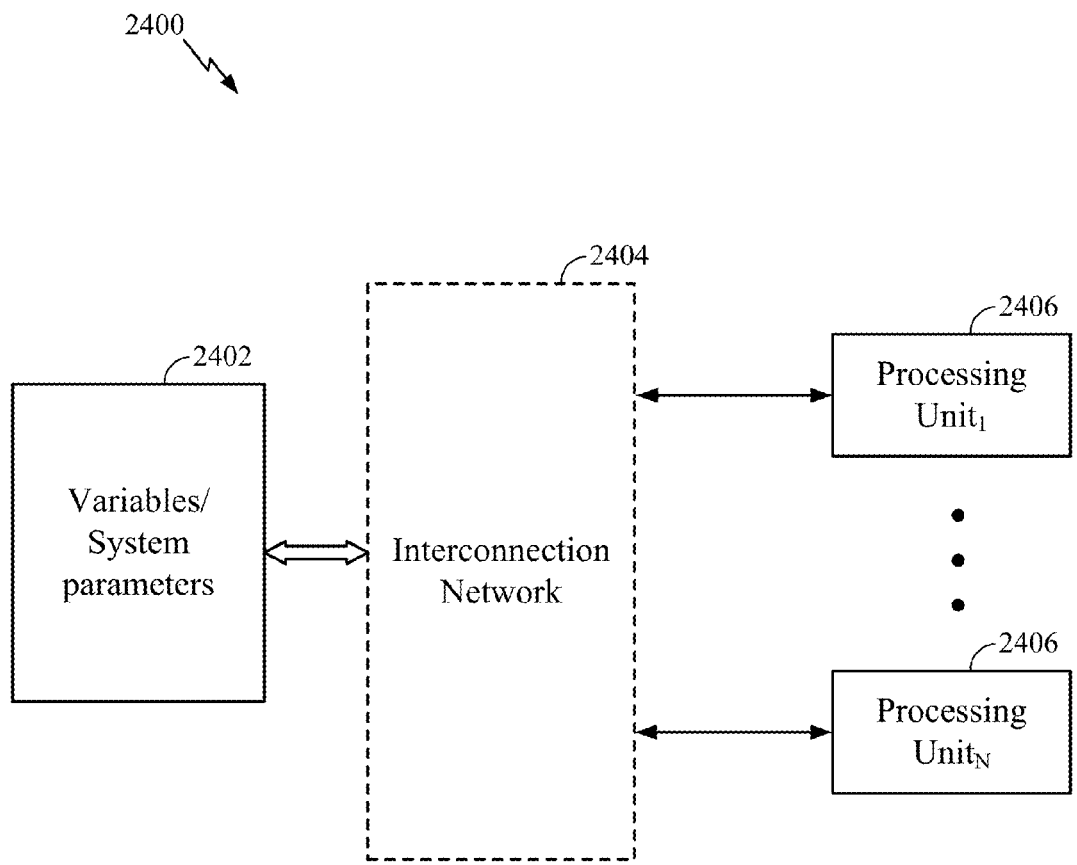
FIG. 24 illustrates an example implementation for operating an artificial nervous system where a memory may be interfaced with individual distributed processing units, in accordance with certain aspects of the present disclosure.

FIG. 24 illustrates an example block diagram 2400 of the aforementioned method for operating an artificial nervous system with a plurality of artificial neurons where a memory 2402 can be interfaced via an interconnection network 2404 with individual (distributed) processing units (neural processors) 2406 of a computational network (neural network) in accordance with certain aspects of the present disclosure. Variables (neural signals), synaptic weights, and/or system parameters associated with the computational network (neural network) may be stored in the memory 2402, and may be loaded from the memory 2402 via connection(s) of the interconnection network 2404 into each processing unit (neural processor) 2406. In an aspect of the present disclosure, the processing unit 2406 may be configured to perform analog waveform recognition in a sub-threshold region of an artificial neuron of the artificial nervous system by providing a predicted waveform in parallel to an input associated with the artificial neuron, to compare the predicted waveform with the input, and to generate a signal based at least in part on the comparison.

Figure 25:
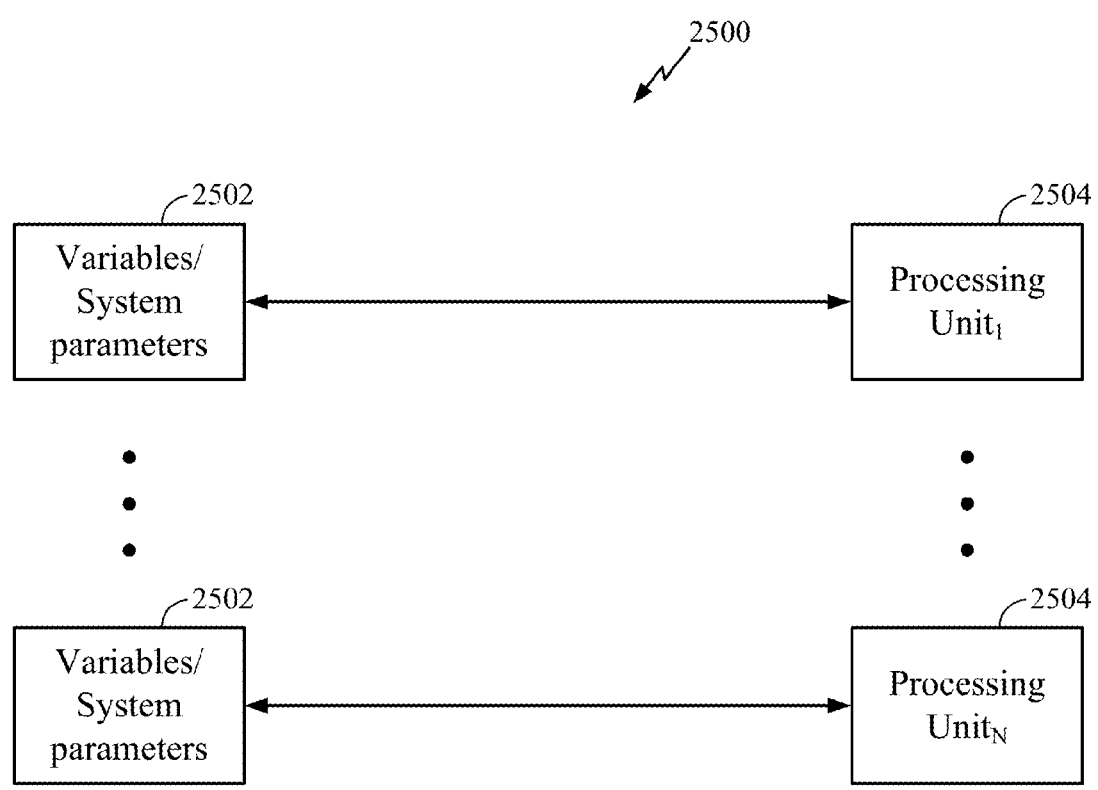
FIG. 25 illustrates an example implementation for operating an artificial nervous system based on distributed memories and distributed processing units, in accordance with certain aspects of the present disclosure.

FIG. 25 illustrates an example block diagram 2500 of the aforementioned method for operating an artificial nervous system with a plurality of artificial neurons based on distributed weight memories 2502 and distributed processing units (neural processors) 2504 in accordance with certain aspects of the present disclosure. As illustrated in FIG. 25, one memory bank 2502 may be directly interfaced with one processing unit 2504 of a computational network (neural network), wherein that memory bank 2502 may store variables (neural signals), synaptic weights, and/or system parameters associated with that processing unit (neural processor) 2504. In an aspect of the present disclosure, the processing unit(s) 2504 may be configured to perform analog waveform recognition in a sub-threshold region of an artificial neuron of the artificial nervous system by providing a predicted waveform in parallel to an input associated with the artificial neuron, to compare the predicted waveform with the input, and to generate a signal based at least in part on the comparison.

Figure 26:
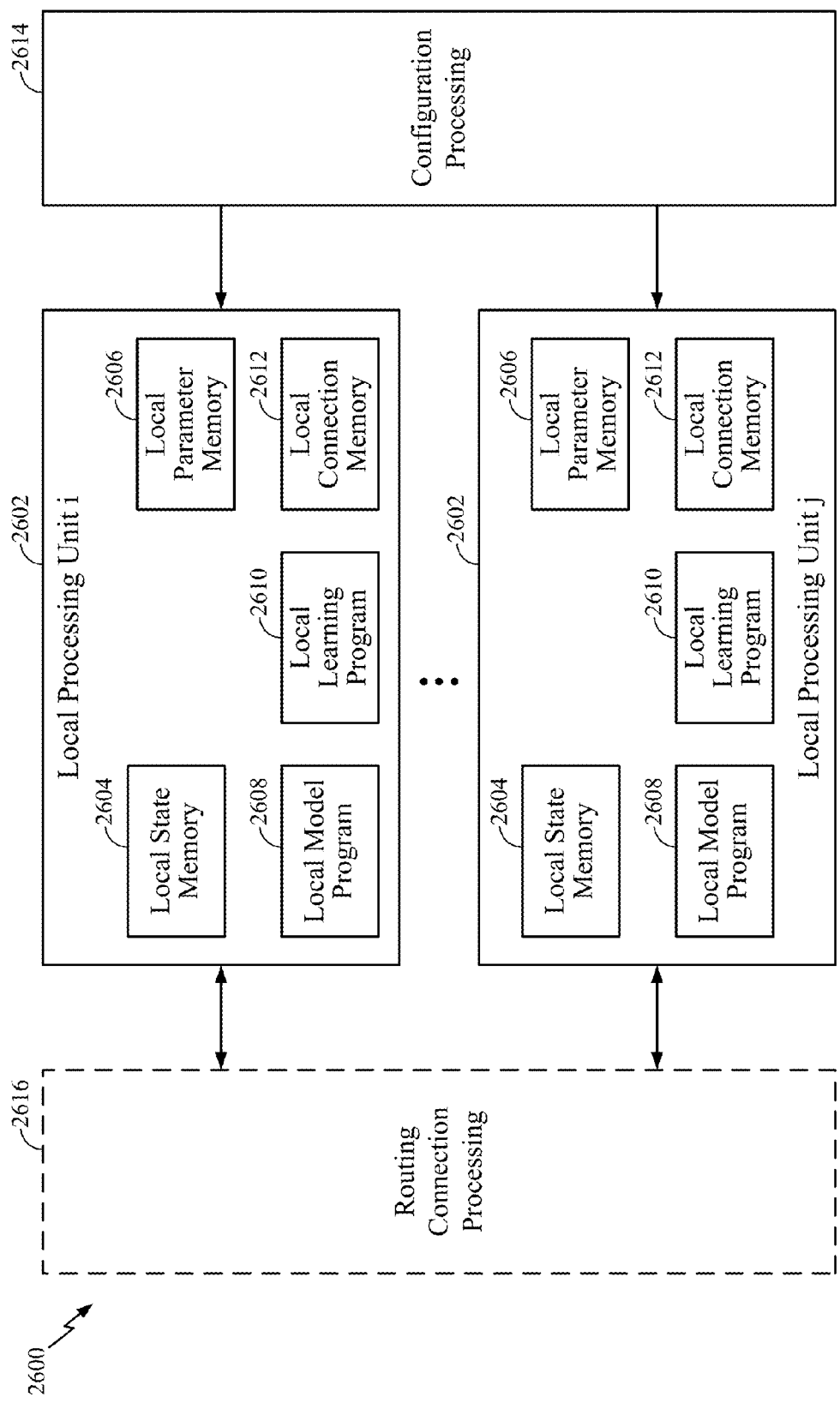
FIG. 26 illustrates an example implementation of a neural network in accordance with certain aspects of the present disclosure.

FIG. 26 illustrates an example implementation of a neural network 2600 in accordance with certain aspects of the present disclosure. As illustrated in FIG. 26, the neural network 2600 may comprise a plurality of local processing units 2602 that may perform various operations of methods described above. Each processing unit 2602 may comprise a local state memory 2604 and a local parameter memory 2606 that store parameters of the neural network. In addition, the processing unit 2602 may comprise a memory 2608 with a local (neuron) model program, a memory 2610 with a local learning program, and a local connection memory 2612. Furthermore, as illustrated in FIG. 26, each local processing unit 2602 may be interfaced with a unit 2614 for configuration processing that may provide configuration for local memories of the local processing unit, and with routing connection processing elements 2616 that provide routing between the local processing units 2602.

According to certain aspects of the present disclosure, each local processing unit 2602 may be configured to determine parameters of the neural network based upon desired one or more functional features of the neural network, and develop the one or more functional features towards the desired functional features as the determined parameters are further adapted, tuned and updated.

Figure 27:
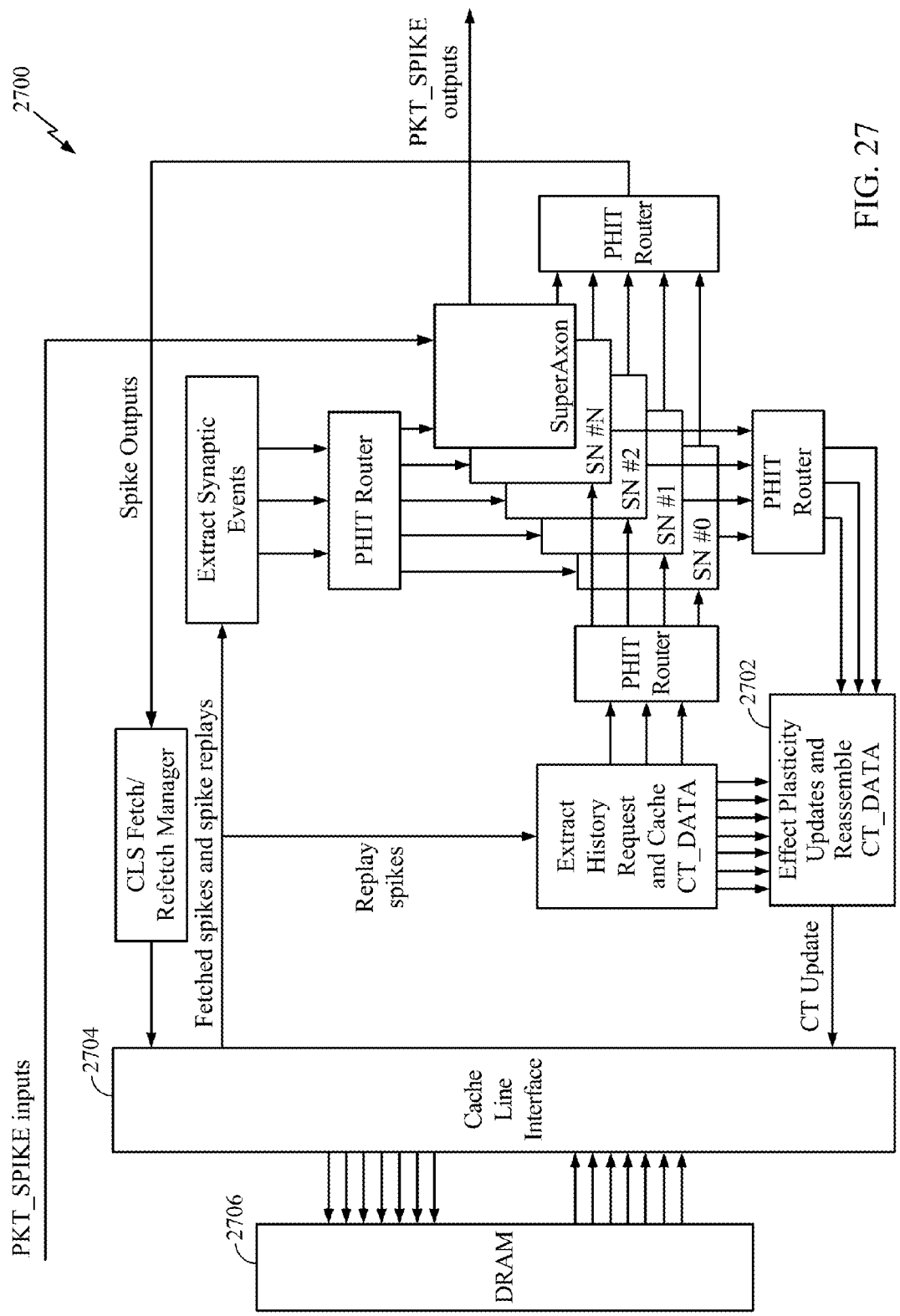
FIG. 27 illustrates an example hardware implementation of an artificial nervous system in accordance with certain aspects of the present disclosure.

FIG. 27 is a block diagram 2700 of an example hardware implementation for an artificial nervous system, in accordance with certain aspects of the present disclosure. STDP updating, as described above, may occur in an Effect Plasticity Updates and Reassemble block 2702. For certain aspects, the updated synaptic weights may be stored (via a cache line interface 2704) in off-chip memory (e.g., dynamic random access memory (DRAM) 2706).

In a typical artificial nervous system, there are many more synapses than artificial neurons, and for a large neural network, processing the synapse updates in an efficient manner is desired. The large number of synapses may suggest storing the synaptic weight and other parameters in memory (e.g., DRAM 2706). When artificial neurons generate spikes in a so-called "super neuron (SN)," the neurons may forward those spikes to the post-synaptic neurons through DRAM lookups to determine the post-synaptic neurons and corresponding neural weights. To enable fast and efficient lookup, the synapse ordering may be kept consecutively in memory based, for example, on fan-out from a neuron. Later when processing STDP updates in block 2702, efficiency may dictate processing the updates based on a forward fan-out given this memory layout since the DRAM or a large lookup table need not be searched to determine the reverse mapping for LTP updates. The approach shown in FIG. 27 facilitates this. The Effect Plasticity Updates and Reassemble block 2702 may query the super neurons in an effort to obtain the pre- and post-synaptic spike times, again reducing the amount of state memory involved.

Figure 22A:
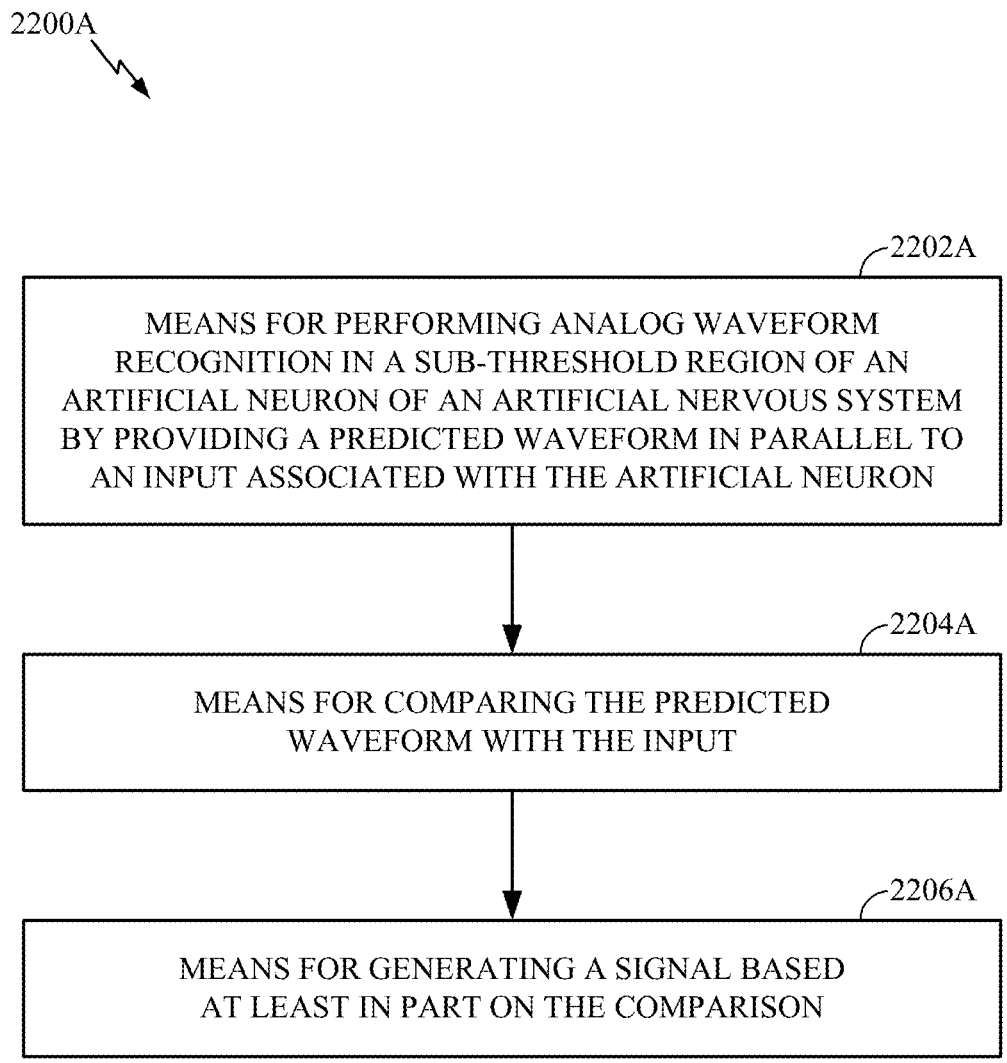
FIG. 22A illustrates example means capable of performing the operations shown in FIG. 22.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various operations may be performed by one or more of the various processors shown in FIGS. 23-27. Generally, where there are operations illustrated in figures, those operations may have corresponding counterpart means-plus-function components with similar numbering. For example, operations 2200 illustrated in FIG. 22 correspond to means 2200A illustrated in FIG. 22A.

For example, means for displaying may include a display (e.g., a monitor, flat screen, touch screen, and the like), a printer, or any other suitable means for outputting data for visual depiction (e.g., a table, chart, or graph). Means for processing, means for receiving, means for tracking, means for adjusting, means for updating, or means for determining may comprise a processing system, which may include one or more processors or processing units. Means for sensing may include a sensor. Means for storing may include a memory or any other suitable storage device (e.g., RAM), which may be accessed by the processing system.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for operating an artificial nervous system, comprising:
    performing analog waveform recognition in a sub-threshold region of an artificial neuron in a neuron circuit of the artificial nervous system by providing a predicted waveform temporally aligned with an input associated with the artificial neuron;
    comparing the predicted waveform with the input by detecting matching and mismatching between the input and the predicted waveform, wherein inter-spike intervals (ISIs) of spikes of tonic firing of the artificial neuron indicate a match between the input and the predicted waveform or a mismatch between the input and the predicted waveform; and
    generating a signal from the artificial neuron based at least in part on the comparison.

2. The method of claim 1, wherein the signal indicates a degree to which the input and the predicted waveform match.

3. The method of claim 1, further comprising:
    updating the predicted waveform based at least in part on the signal.

4. The method of claim 1, wherein the input comprises a plurality of input signals.

5. The method of claim 1, further comprising:
    generating, by a detector artificial neuron of the artificial nervous system based at least in part on the signal, a detection signal that detects matching between the input and the predicted waveform.

6. The method of claim 1, wherein the ISIs indicate matching between the input and the predicted waveform if variations of the ISIs are bounded by a defined value.

7. The method of claim 1, further comprising:
    generating an alert when one or more of the ISIs is greater than a first threshold or smaller than a second threshold.

8. The method of claim 7, wherein the alert is generated by a jitter detector of the artificial nervous system, a delay line of the artificial nervous system, or a leaky integrate-and-fire (LIF) neural network within the artificial nervous system.

9. The method of claim 1, further comprising:
    tuning a frequency of sampling of the tonic firing to match inherent dynamics of a signal associated with the tonic firing.

10. The method of claim 9, further comprising:
    tuning the frequency of sampling of the tonic firing by adjusting one or more parameters of the artificial neuron.

11. The method of claim 1, further comprising:
    generating the predicted waveform as a sum of inhibitory post-synaptic currents (IPSCs) generated by precisely-timed and weighted interneuron spikes of the artificial nervous system.

12. The method of claim 11, further comprising:
    performing a learning mechanism for generating the interneuron spikes by using weight and delay plasticity rules.

13. The method of claim 11, further comprising:
    performing a learning mechanism for generating the interneuron spikes by using weight plasticity to adjust contributions of individual basis spike functions associated with inhibitory artificial neurons of the artificial nervous system.

14. The method of claim 13, wherein the chaotic Cold neuron model for the inhibitory artificial neurons provides a library of spike times associated with the inhibitory artificial neurons.

15. The method of claim 14, wherein the learning mechanism is based at least in part on the library of spike times.

16. An apparatus for operating an artificial nervous system, comprising:
    a first circuit configured to perform analog waveform recognition in a sub-threshold region of an artificial neuron in a neuron circuit of the artificial nervous system by providing a predicted waveform temporally aligned with an input associated with the artificial neuron;

a second circuit configured to compare the predicted waveform with the input by detecting matching and mismatching between the input and the predicted waveform, wherein inter-spike intervals (ISIs) of spikes of tonic firing of the artificial neuron indicate a match between the input and the predicted waveform or a mismatch between the input and the predicted waveform; and a third circuit configured to generate a signal from the artificial neuron based at least in part on the comparison.

17. The apparatus of claim 16, wherein the signal indicates a degree to which the input and the predicted waveform match.

18. The apparatus of claim 16, further comprising:
a fourth circuit configured to update the predicted waveform based at least in part on the signal.

19. The apparatus of claim 16, wherein the input comprises a plurality of input signals.

20. The apparatus of claim 16, further comprising:
a fourth circuit configured to generate, by a detector artificial neuron of the artificial nervous system based at least in part on the signal, a detection signal that detects matching between the input and the predicted waveform.

21. The apparatus of claim 16, wherein the ISIs indicate matching between the input and the predicted waveform if variations of the ISIs are bounded by a defined value.

22. The apparatus of claim 16, further comprising:
a fourth circuit configured to generate an alert when one or more of the ISIs is greater than a first threshold or smaller than a second threshold.

23. The apparatus of claim 22, wherein the alert is generated by a jitter detector of the artificial nervous system, a delay line of the artificial nervous system, or a leaky integrate-and-fire (LIF) neural network within the artificial nervous system.

24. The apparatus of claim 16, further comprising:
a fourth circuit configured to tune a frequency of sampling of the tonic firing to match inherent dynamics of a signal associated with the tonic firing.

25. The apparatus of claim 24, wherein the fourth circuit is also configured to:
tune the frequency of sampling of the tonic firing by adjusting one or more parameters of the artificial neuron.

26. The apparatus of claim 16, further comprising:
a fourth circuit configured to generate the predicted waveform as a sum of inhibitory post-synaptic currents (IPSCs) generated by precisely-timed and weighted interneuron spikes of the artificial nervous system.

27. The apparatus of claim 26, further comprising:
a fifth circuit configured to perform a learning mechanism for generating the interneuron spikes by using weight and delay plasticity rules.

28. The apparatus of claim 26, further comprising:
a fifth circuit configured to perform a learning mechanism for generating the interneuron spikes by using weight plasticity to adjust contributions of individual basis spike functions associated with inhibitory artificial neurons of the artificial nervous system.

29. The apparatus of claim 28, wherein the chaotic Cold neuron model for the inhibitory artificial neurons provides a library of spike times associated with the inhibitory artificial neurons.

30. The apparatus of claim 29, wherein the learning mechanism is based at least in part on the library of spike times.

31. An apparatus for operating an artificial nervous system, comprising:
means for performing analog waveform recognition in a sub-threshold region of an artificial neuron in a neuron circuit of the artificial nervous system by providing a predicted waveform temporally aligned with an input associated with the artificial neuron;

means for comparing the predicted waveform with the input by detecting matching and mismatching between the input and the predicted waveform, wherein inter-spike intervals (ISIs) of spikes of tonic firing of the artificial neuron indicate a match between the input and the predicted waveform or a mismatch between the input and the predicted waveform; and means for generating a signal from the artificial neuron based at least in part on the comparison.

32. The apparatus of claim 31, wherein the signal indicates a degree to which the input and the predicted waveform match.

33. The apparatus of claim 31, further comprising:
means for updating the predicted waveform based at least in part on the signal.

34. The apparatus of claim 31, wherein the input comprises a plurality of input signals.

35. The apparatus of claim 31, further comprising:
means for generating, by a detector artificial neuron of the artificial nervous system based at least in part on the signal, a detection signal that detects matching between the input and the predicted waveform.

36. The apparatus of claim 31, wherein the ISIs indicate matching between the input and the predicted waveform if variations of the ISIs are bounded by a defined value.

37. The apparatus of claim 31, further comprising:
means for generating an alert when one or more of the ISIs is greater than a first threshold or smaller than a second threshold.

38. The apparatus of claim 37, wherein the alert is generated by a jitter detector of the artificial nervous system, a delay line of the artificial nervous system, or a leaky integrate-and-fire (LIF) neural network within the artificial nervous system.

39. The apparatus of claim 31, further comprising:
means for tuning a frequency of sampling of the tonic firing to match inherent dynamics of a signal associated with the tonic firing.

40. The apparatus of claim 39, further comprising:
means for tuning the frequency of sampling of the tonic firing by adjusting one or more parameters of the artificial neuron.

41. The apparatus of claim 31, further comprising:
means for generating the predicted waveform as a sum of inhibitory post-synaptic currents (IPSCs) generated by precisely-timed and weighted interneuron spikes of the artificial nervous system.

42. The apparatus of claim 41, further comprising:
means for performing a learning mechanism for generating the interneuron spikes by using weight and delay plasticity rules.

43. The apparatus of claim 41, further comprising:
means for performing a learning mechanism for generating the interneuron spikes by using weight plasticity to adjust contributions of individual basis spike functions associated with inhibitory artificial neurons of the artificial nervous system.

44. The apparatus of claim 43, wherein the chaotic Cold neuron model for the inhibitory artificial neurons provides a library of spike times associated with the inhibitory artificial neurons.

45. The apparatus of claim 44, wherein the learning mechanism is based at least in part on the library of spike times.

46. A non-transitory computer-readable medium for operating an artificial nervous system, the non-transitory computer-readable medium having instructions executable to:
perform analog waveform recognition in a sub-threshold region of an artificial neuron in a neuron circuit of the artificial nervous system by providing a predicted waveform temporally aligned with an input associated with the artificial neuron;
compare the predicted waveform with the input by detecting matching and mismatching between the input and the predicted waveform, wherein inter-spike intervals (ISIs) of spikes of tonic firing of the artificial neuron indicate a match between the input and the predicted waveform or a mismatch between the input and the predicted waveform; and
generate a signal from the artificial neuron based at least in part on the comparison.

47. The non-transitory computer-readable medium of claim 46, wherein the signal indicates a degree to which the input and the predicted waveform match.

48. The non-transitory computer-readable medium of claim 46, further comprising code for:
updating the predicted waveform based at least in part on the signal.

49. The non-transitory computer-readable medium of claim 46, wherein the input comprises a plurality of input signals.

50. The non-transitory computer-readable medium of claim 46, further comprising code for:
generating, by a detector artificial neuron of the artificial nervous system based at least in part on the signal, a detection signal that detects matching between the input and the predicted waveform.

51. The non-transitory computer-readable medium of claim 46, wherein the ISIs indicate matching between the input and the predicted waveform if variations of the ISIs are bounded by a defined value.

52. The non-transitory computer-readable medium of claim 46, further comprising code for:
generating an alert when one or more of the ISIs is greater than a first threshold or smaller than a second threshold.

53. The non-transitory computer-readable medium of claim 52, wherein the alert is generated by a jitter detector of the artificial nervous system, a delay line of the artificial nervous system, or a leaky integrate-and-fire (LIF) neural network within the artificial nervous system.

54. The non-transitory computer-readable medium of claim 46, further comprising code for:
tuning a frequency of sampling of the tonic firing to match inherent dynamics of a signal associated with the tonic firing.

55. The non-transitory computer-readable medium of claim 54, further comprising code for:
tuning the frequency of sampling of the tonic firing by adjusting one or more parameters of the artificial neuron.

56. The non-transitory computer-readable medium of claim 46, further comprising code for:
generating the predicted waveform as a sum of inhibitory post-synaptic currents (IPSCs) generated by precisely-timed and weighted interneuron spikes of the artificial nervous system.

57. The non-transitory computer-readable medium of claim 56, further comprising code for:
performing a learning mechanism for generating the interneuron spikes by using weight and delay plasticity rules.

58. The non-transitory computer-readable medium of claim 56, further comprising code for:
performing a learning mechanism for generating the interneuron spikes by using weight plasticity to adjust contributions of individual basis spike functions associated with inhibitory artificial neurons of the artificial nervous system.

59. The non-transitory computer-readable medium of claim 58, wherein the chaotic Cold neuron model for the inhibitory artificial neurons provides a library of spike times associated with the inhibitory artificial neurons.

60. The non-transitory computer-readable medium of claim 59, wherein the learning mechanism is based at least in part on the library of spike times.

* * * * *